United States Patent
Crabtree

(10) Patent No.: US 7,400,745 B2
(45) Date of Patent: Jul. 15, 2008

(54) SYSTEMS AND METHODS FOR DETERMINING IF OBJECTS ARE IN A QUEUE

(75) Inventor: Ralph N. Crabtree, Atlanta, GA (US)

(73) Assignee: Brickstream Corporation, Atlanta, GA (US)

( * ) Notice: Subject to any disclaimer, the term of this patent is extended or adjusted under 35 U.S.C. 154(b) by 0 days.

(21) Appl. No.: 11/668,232

(22) Filed: Jan. 29, 2007

(65) Prior Publication Data

US 2007/0122002 A1    May 31, 2007

Related U.S. Application Data

(63) Continuation of application No. 10/724,394, filed on Dec. 1, 2003, now Pat. No. 7,171,024.

(51) Int. Cl.
*G06K 9/00* (2006.01)

(52) U.S. Cl. ..................................................... 382/103

(58) Field of Classification Search ................. 382/103, 382/104
See application file for complete search history.

(56) References Cited

U.S. PATENT DOCUMENTS

| | | | |
|---|---|---|---|
| 4,739,401 A | 4/1988 | Sacks et al. |
| 5,097,328 A | 3/1992 | Boyette |
| 5,280,530 A | 1/1994 | Trew et al. |
| 5,285,273 A | 2/1994 | James et al. |
| 5,323,470 A | 6/1994 | Kara et al. |
| 5,434,927 A | 7/1995 | Brady et al. |
| 5,491,645 A | 2/1996 | Kennedy et al. |
| 5,513,854 A | 5/1996 | Daver |
| 5,570,096 A | 10/1996 | Knight et al. |
| 5,581,625 A | 12/1996 | Connell |
| 5,731,846 A | 3/1998 | Kreitman et al. |
| 5,754,694 A | 5/1998 | Villalba |
| 5,761,826 A | 6/1998 | Baur |
| 5,764,283 A | 6/1998 | Pingali et al. |
| 5,809,161 A | 9/1998 | Auty et al. |
| 5,845,009 A | 12/1998 | Marks et al. |
| 5,883,969 A | 3/1999 | Le Gouzouguec et al. |
| 5,923,365 A | 7/1999 | Tamir et al. |
| 5,947,413 A | 9/1999 | Mahalanobis |
| 5,959,529 A | 9/1999 | Kail, IV |
| 5,966,074 A | 10/1999 | Baxter |
| 5,969,755 A | 10/1999 | Courtney |
| 6,049,363 A | 4/2000 | Courtney et al. |
| 6,061,088 A | 5/2000 | Khosravi et al. |
| 6,067,031 A | 5/2000 | Janky et al. |
| 6,084,979 A | 7/2000 | Kanade et al. |

(Continued)

OTHER PUBLICATIONS

Lai et al., "Deformable Contours: Modeling and Extraction", Electrical and Computer Engineering, University of Wisconsin, 1994.

(Continued)

*Primary Examiner*—Tom Y Lu
(74) *Attorney, Agent, or Firm*—Cooley Godward Kronish LLP

(57) ABSTRACT

Systems and methods that determine a position value of a first object and a position value of a second object, and compare the position value of the first object with the position value of the second object to determine if the second object is in a queue with the first object are provided.

29 Claims, 9 Drawing Sheets

U.S. PATENT DOCUMENTS

| | | | |
|---|---|---|---|
| 6,141,433 | A | 10/2000 | Moed et al. |
| 6,185,314 | B1 | 2/2001 | Crabtree et al. |
| 6,195,121 | B1 | 2/2001 | Huang et al. |
| 6,233,008 | B1 | 5/2001 | Chun |
| 6,246,323 | B1 | 6/2001 | Fischbach |
| 6,263,088 | B1 | 7/2001 | Crabtree et al. |
| 6,295,367 | B1 | 9/2001 | Crabtree et al. |
| 6,359,647 | B1 | 3/2002 | Sengupta et al. |
| 6,396,535 | B1 | 5/2002 | Waters |
| 6,404,455 | B1 | 6/2002 | Ito et al. |
| 6,441,734 | B1 | 8/2002 | Gutta et al. |
| 6,441,846 | B1 | 8/2002 | Carlbom et al. |
| 6,442,474 | B1 | 8/2002 | Trajkovic et al. |
| 6,445,409 | B1 | 9/2002 | Ito et al. |
| 6,542,621 | B1 | 4/2003 | Brill et al. |
| 6,554,047 | B1 | 4/2003 | Mondragon et al. |
| 6,584,211 | B1 | 6/2003 | Amemiya et al. |
| 6,628,835 | B1 | 9/2003 | Brill et al. |
| 6,654,047 | B2 | 11/2003 | Iizaka |
| 6,816,186 | B2 | 11/2004 | Luke et al. |
| 2003/0107649 | A1 | 6/2003 | Flickner et al. |

OTHER PUBLICATIONS

Lane et al., "Robust Tracking of Multiple Objects in Sector-Scan Sonar Image Sequences Using Optical Flow Motion Estimation", *IEEE Journal of Oceanic Engineering*, vol. 23, No. 1, Jan. 1998.

Tsai et al., "Uniqueness and Estimation of Three-Dimensional Motion Parameters of Rigid Objects With Curved Surfaces", *IEEE Pattern Recognition and Image Processing*, 1982.

Liao, "Tracking Human Movements Using Finita Element Methods", Computer and Vision Research Center, Dept. of Electrical and Computer Engineering, ENS, The University of Texas at Austin, May 20, 1994.

Salari et al., "Feature Point Correspondence in the Presence of Occlusion", *IEEE Transactions on Pattern Analysis and Machine Intelligence*, vol. 12, No. 1, Jan. 1990.

Montera et al., "Object Tracking Through Adaptive Correlation", *Optical Engineering*, vol. 33, No. 1, Jan. 1994.

Sethi et al., "Finding Trajectories of Feature Points in a Monocular Image Sequence", *IEEE Transactions of Pattern Analysis and Machine Intelligence*, vol. PAMI-9, No. 1, Jan. 1987.

Tsai et al., "Estimating Three-Dimensional Motion Parameters of a Rigid Planar Patch", *IEEE Pattern Recognition and Image Processing*, 1981.

Cai et al., "Automatic Tracking of Human Motion in Indoor Scenes Across Multiple Synchronized Video Streams", Computer and Vision Research Center, Dept. of Electrical and Computer Engineering, ENS, The University of Texas at Austin, 1990.

Celenk et al., "Moving Object Tracking Using Local Windows", *Proceedings IEEE International Symposium on Intelligent Control 1988*, IEEE Computer Society Press, 1989.

Burt et al., "Object Tracking With A Moving Camera: An Application of Dynamic Motion Analysis", *Proceedings Workshop on Visual Motion*, IEEE Computer Society, Order No. 1903, 1989.

U.S. Appl. No. 09/960,218, filed Sep. 21, 2001, Crabtree et al.

U.S. Appl. No. 09/960,617, filed Sep. 21, 2001, Crabtree et al.

Supplemental Search Report, European Application No. 04795630, mailed Aug. 10, 2007, 2 pages.

International Preliminary Report on Patentability, International Application. No. PCT/US2004/034492, mailed Jun. 15, 2006, 6 pages.

SYSTEMS AND METHODS FOR DETERMINING IF OBJECTS ARE IN A QUEUE

CROSS-REFERENCE TO RELATED PATENT APPLICATIONS

This application is a continuation application of U.S. patent application Ser. No. 10/724,394 entitled, "Systems and Methods for Determining if Objects are in a Queue", filed Dec. 1, 2003 (Now U.S. Pat. No. 7,171,024), the entirety of which is incorporated herein by reference.

FIELD OF THE INVENTION

Embodiments of the invention concern systems and methods that determine if objects, such as customers in a retail environment, are in a queue.

BACKGROUND

Systems exist that determine if objects are in a queue. For example, FIG. 6 illustrates a retail environment 50 that includes two service locations 52a, 52b (e.g., cash register locations, etc.). Two objects (e.g., tracked customers, images of retail customers, etc.) 54a, 54b are shown at the two respective service locations 52a, 52b. Two objects 56a, 56b are awaiting service at the first service locations 52a in a first queue 56, and another object 58a is awaiting service at the second service location 52b in a second queue 58. Another object 60 is passing between the two queues 56, 58, moving in the direction of the service locations, and does not intend to enter either of the queues 56, 58. Yet another object 62 is at a display 64, and does not intend to enter either queue.

Prior systems attempted to determine which objects are in a queue, such as the first queue 56 and the second queue 58, by tracking the positions of each object (e.g., by way of an image tracking device or other sensor) in a region of interest for each queuing location. For example, a first region of interest 66 might be established to determine which objects, if any, are waiting in the first queue 56 to be serviced by the first service location 52a. A second region of interest 68 might be established to determine which objects, if any, are awaiting service in the second queue 58 by the second service location 52b. In such prior systems, it is difficult to determine which objects are located within one of the queues, if objects can perform other tasks in or near the regions of interest 66, 68. For example, the object 60 that is passing between the two queues 56, 58 is within the first region of interest 66, and therefore might inaccurately be determined by prior systems to be in the first queue 56. Additionally, the object 62 examining the product display 64 is within the second region of interest 68, and therefore might inaccurately be determined by prior systems to be in the second queue 58. Moreover, such systems are unable to determine if the queues 56, 58 extend outside the respective regions of interest 66, 68, such as when the queue curves or bends. Thus, as can be seen from the above description, prior systems might inaccurately characterize some objects that are not within a queue (e.g., objects 60, 62) as being within a queue, and might omit some objects that are waiting in a queue from being characterized as being within the queue, depending upon the correlation of the geometry of the regions of interest 66, 68 with the shape of the queue.

SUMMARY

Accordingly, some embodiments of the present invention strive to provide systems and methods that determine when objects are in or out of a queue. In an embodiment, this is determined from the relative position of the objects with respect to each other.

According to an embodiment of the invention, a method determines at least one position value of a first object, determines at least one position value of a second object, and compares the position value of the first object with the position value of the second object to determine if the second object is in a queue with the first object. According to one or more embodiments of the invention, the velocity of the second object can also be used to determine if the second object is in the queue.

According to another embodiment of the invention, a method determines if a first track associated with a first object meets a predetermined seed parameter, and determines if a second track associated with a second object meets a predetermined queue parameter. The predetermined seed parameter includes at least a position value of the first object. The predetermined queue parameter includes at least a position value of the second object relative to the position value of the first object.

According to another embodiment of the invention, a system and method use a processor configured to analyze movement of sensed objects to determine if a first track associated with a first object meets a predetermined seed parameter, and to determine if a second track associated with a second object meets a predetermined queue parameter.

Other advantages and features associated with embodiments of the present invention will become more readily apparent to those skilled in the art from the following detailed description. As will be realized, the invention is capable of other and different embodiments, and its several details are capable of modification in various obvious aspects, all without departing from the invention. Accordingly, the drawings in the description are to be regarded as illustrative in nature, and not limitative.

DETAILED DESCRIPTION

Systems and methods of the invention provide the capability of identifying object behavior, such as customer behavior in retail environments, or the like. More specifically, systems and methods of the invention identify object behavior in queuing areas and other areas of interest. This is accomplished by tracking objects (e.g., by tracking positions of objects using images of objects or other sensor data) using a sensor (e.g., an image capture device, a radio tracking device sensor, etc.), and analyzing tracks associated with each of the objects. Illustrative embodiments of the invention are described below. The examples provided herein, however, are intended solely as examples, and are not intended as an exhaustive list of embodiments of the invention, or ways in which the invention can be implemented.

Figure 1:
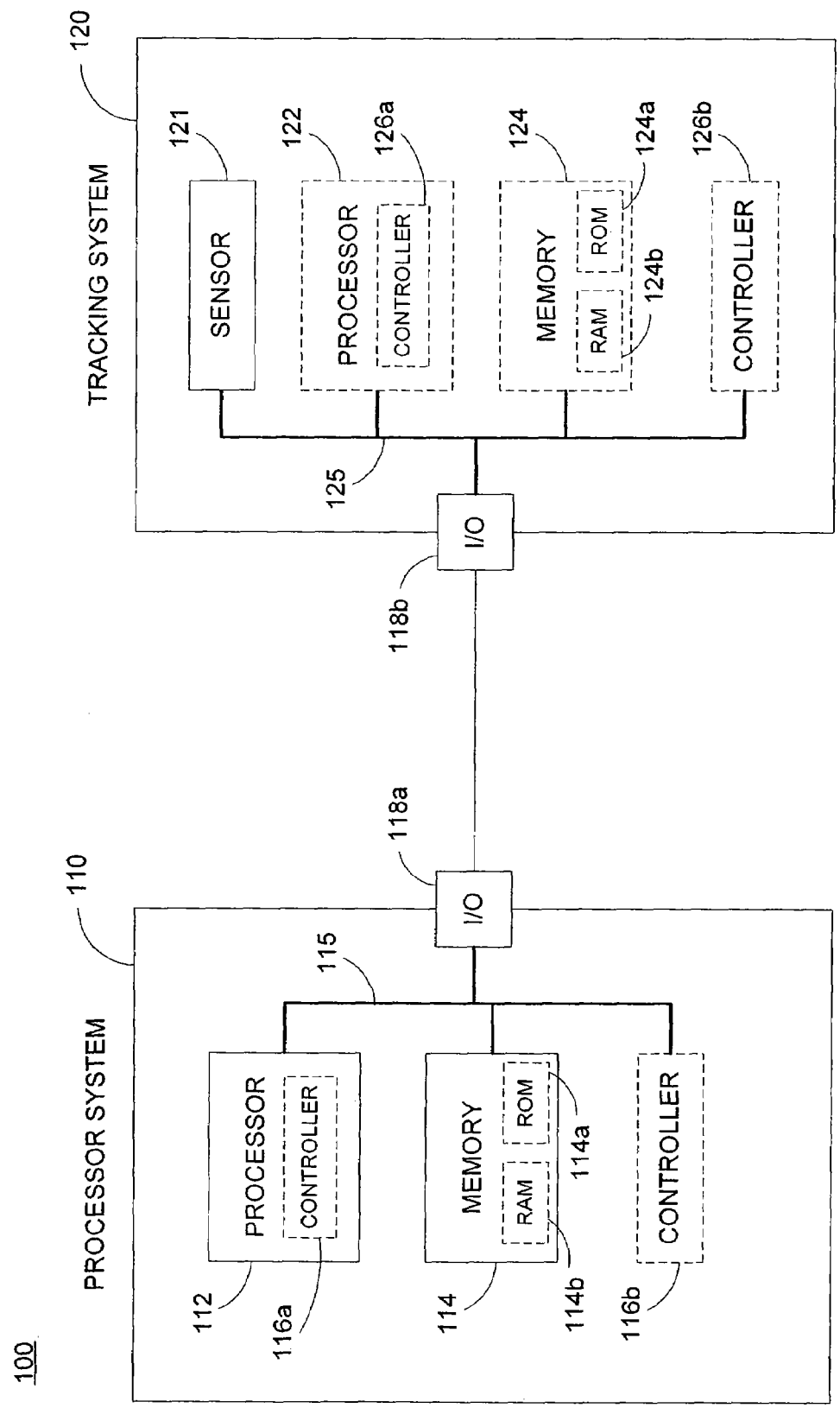
FIG. 1 is a block diagram of a system, including a processor system and a tracking system, according to an embodiment of the invention.

FIG. 1 is a block diagram of a system 100, including a processor system 110 and a tracking system 120, according to an embodiment of the invention. The processor system 110 can be, for example, a general computing system, such as a personal computer, a workstation, or the like. Alternatively, the processor system 110 can be a more specialized device, such as an application-specific processor system, which can use one or more application-specific integrated circuits (ASICs). The processor system 110 can also be an embedded control system, which is designed for a specific use with a particular interface device.

The processor system 110 includes a processor 112, which, according to one or more embodiments of the invention, can be a commercially available microprocessor, such as the 80X86 series of microprocessors available from Intel Corp., the power PC series of microprocessors available from Motorola, Inc., the AMD series of microprocessors available from Advanced Micro Devices, Inc., or other microprocessors. Alternatively, the processor 112 can be an application-specific integrated circuit (ASIC), which is designed to achieve one or more specific functions, or enable one or more specific devices or applications.

Alternatively, the processor 112 can optionally include one or more individual sub-processors or co-processors. For example, the processor can include a graphics co-processor that is capable of rendering graphics, a controller that is capable of controlling one or more devices, a sensor that is capable of receiving sensory input from one or more sensing devices, and so forth.

The processor system 110 also includes a memory component 114. As shown in FIG. 1, the memory component 114 can include one or more types of memory. For example, the memory component 114 can include a read-only memory (ROM) component 114a, and/or a random access memory (RAM) component 114b. The memory component 114 can also include other types of memory not illustrated in FIG. 1, but which are suitable for storing data in a form retrievable by the processor 112. For example, electronically programmable read-only memory (EPROM), erasable electronically programmable read-only memory (EEPROM), flash memory, as well as other suitable forms of memory can be included within the memory component 114. The processor system 110 can also include a variety of other components, depending upon the desired functionality of the processor system 110. The processor 112 is in communication with the memory component 114, and can store data in the memory component 114 or retrieve data previously stored in the memory component 114. Data communicated between the processor 112, the memory component 114, or other components of the processor system 110, can be communicated via a bus 115, which can use a variety of suitable bus protocols for addressing data to and from each of the components connected thereto.

The processor system 110 can optionally use the one or more controllers 116a, 116b (which can be referred to either collectively or individually herein as controller 116 or controllers 116). As shown in FIG. 1, a controller 116a can optionally exist within the processor 112 of the processor system 110. Additionally, or alternatively, a controller 116b can be a separate component within the processor system 110, and can communicate with the other components of the processor system 110 via the bus 115 or other suitable connection. The various components of the processor system 110 can communicate with devices external to the processor system 110 by way of an input/output (I/O) component 118a, which can receive data from and/or communicate data to other components via the bus 115.

According to one or more embodiments of the invention, the I/O component 118a can include a variety of suitable connection interfaces. For example, the I/O component 118a can include wired connections, such as standard serial ports, parallel ports, universal serial bus (USB) ports, S-video ports, large area network (LAN) ports, small computer system interface (SCSI) ports, or other suitable wired connections. Additionally, the I/O component 118a can include, for example, wireless connections, such as infrared ports, optical ports, Bluetooth wireless ports, wireless LAN ports, ultra-wide band (UWB) wireless ports, and so forth.

By way of the I/O component 118a, the processor system 110 can communicate with other devices, such as the tracking system 120 illustrated in FIG. 1. The tracking system 120 can communicate with the processor system 110, and other devices external to the tracking system 120 via an I/O port 118b, which is similar to the I/O port 118a of the processor system 110. Like the I/O port 118a of the processor system 110, the I/O port 118b of the tracking system 120 can include a variety of interfaces, such as those interfaces described above in connection with the I/O port 118a of the processor system 110.

The tracking system 120 can include several components, such as a sensor 121, a processor, a memory component 124, and other devices, such as controllers, or the like. As with the bus 115 of the processor system 110, the bus 125 of the tracking system 120 can communicate data between components of the tracking system 120, and to and from the I/O component 118b of the tracking system 120. In this manner, the bus 125 of the tracking system 120 facilitates data communication between the tracking system 120 and devices external to the tracking system 120.

Additionally, as with the processor system 110, the tracking system 120 can optionally include one or more controllers 126a, 126b (which can be referred to herein either collectively or individually as controller 126 or controllers 126). Thus, a controller 126a can optionally form part of the processor 122 of the tracking system 120. Alternatively, an external controller 126b can be connected to the components of the tracking system 120 via the bus 125 of the tracking system 120, which can utilize a variety of suitable addressing techniques for communicating data between the various components of the tracking system 120.

The sensor 121 can include one or more of a variety of components suitable for collecting tracking information for one or more objects. For example, according to one or more embodiments of the invention, the sensor 121 can include an image capture device, such as a video camera (e.g., an analog video camera, a digital video camera, a CCTV camera, a stereo camera, etc.), a still-image camera (e.g., an analog camera, a digital camera, etc.) configured to capture a series of still images, a digital imaging device, such as a charge-coupled display (CCD) camera, or another suitable image capture device. Alternatively, according to one or more embodiments of the invention, the sensor 121 can be a device configured to acquire position coordinates for a variety of objects using techniques other than imaging. For example, the sensor can include pressure sensitive mats, active tags, such are radio-frequency (RF) emitter or transponder tags, or other devices that provide position or trajectory information of an object over time. The sensor 121 can be configured to capture tracking information using a variety of techniques capable of sensing a variety of sensory data. For example, the sensor 121 can capture images using visible light wavelengths, infrared wavelengths, and/or ultraviolet wavelengths. Additionally, the sensor 121 can be configured to sense RF radiation, detect heat, detect sound waves (e.g., sonar), and so forth.

According to one or more embodiments of the invention, the sensor 121 can capture data at a fixed frame rate. Alternatively, the sensor 121 can capture data at a variable rate, which varies according to the amount of data captured in each frame or capture instance. For example, the frame capture rate of the sensor 121 can vary between approximately four frames per second and twenty frames per second. According to one or more embodiments of the invention, the frame rate can vary between about eight frames per second and fifteen frames per second depending upon the amount of information being tracked in each frame.

The tracking system 120 can also optionally include a processor 122, which can process information sensed by the sensor. For example, according to one or more embodiments of the invention, the processor 122 of the tracking system 120 can analyze data sensed by the sensor. The processor 122 can be programmed in this regard, to process the information obtained by the sensor, or information stored in a memory component 114, 124 according to one or more programmed algorithms, which can be stored in a memory component 114, 124.

The tracking system 120 can optionally include a memory component 124, which can be similar to the memory component 114 of the processor system 110. For example, the memory component 124 of the tracking system 120 can include one or more types of memory, such as a ROM component 124a and/or a RAM component 124b. Additionally, as with the memory component 114 of the processor system 110, the memory component 124 of the tracking system 120 can include other types of memory not illustrated in FIG. 1, such as those described above in connection with the memory component 114 of the processor system 110.

Tracking information obtained via the sensor 121 can be stored locally in a local memory 124, which can optionally form a part of the tracking system 120, or can be transmitted to a processor system 110 (which can be located remotely from the tracking system 120). The information transmitted to the processor system 110 can be stored in the memory component 114 of the processor system 110. The information obtained by the sensor 121 can be stored in memory 114, 124 using a suitable conventional image storage technique, which can be determined and/or implemented, for example, by one or more of the optional controllers 116a, 116b, 126a, 126b, shown in FIG. 1.

According to one or more embodiments of the invention, the information stored in the memory component 124 of the tracking system 120 or the memory component 114 of the processor system 110 can be analyzed using a variety of techniques described in greater detail below. Information obtained by the sensor 121 (e.g., image data, etc.) can be, according to one or more embodiments of the invention, analyzed by one or more components of the tracking system 120, such as the processor 122 using one or more of the techniques described below. Alternatively, according to one or more embodiments of the invention, the processor 112 of the processor system 110, can analyze the information stored in a memory component 114, 124 using one or more of the techniques described below. Alternatively, information (e.g., image data, etc.) obtained by the sensor 121 of the tracking system 120 can be analyzed by one or more processors external to the system 100 shown in FIG. 1. Thus, the analysis of information obtained by the sensor 121 can be performed locally or remotely, as in a distributed network environment.

Figure 2:
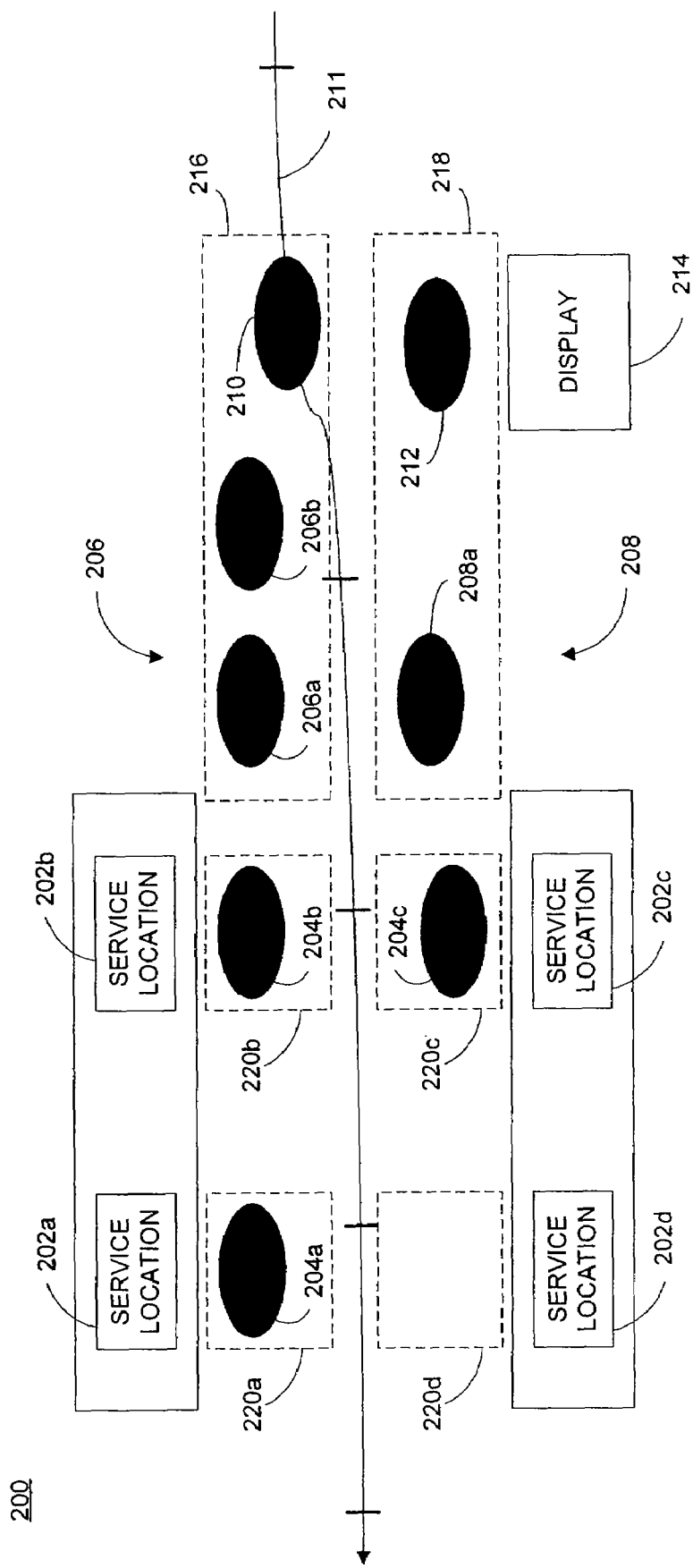
FIG. 2 is a schematic diagram of a floor plan illustrating various aspects of an embodiment of the invention.

FIG. 2 is a schematic diagram of a floor plan illustrating various aspects of an embodiment of the invention. In FIG. 2, an environment 200 in which the various techniques of one or more embodiments of the invention can be used is illustrated. Specifically, multiple service locations 202a, 202b, 202c, 202d (which can be referred to herein individually, collectively, or as a subset as service location 202 or service locations 202). The service locations 202 can represent, for example, locations in which customers in a retail environment receive service from employees of the retail establishment. For example, according to one or more embodiments of the invention, service locations 202 to be analyzed, using the system 100 (shown in FIG. 1) can include cash register locations. It should be recognized, however, that the service locations 202 can include a variety of different types of servicing locations, such as the location of bank tellers, customer service counters, product pick-up locations, toll booths, or the like.

According to one or more embodiments of the invention, each individual (e.g., customer) in the environment 200 (shown as ovals in FIG. 2) has a track associated therewith. A "track" is the path of an object over a time period, whether the object remains stationary or moves during the time period. The track, or path of an object, can be identified by a tracking system that tracks the object (e.g., using imaging or other tracking systems) at one or more locations over some time period. A series of data associated with the track of the image of each object captured using a sensor 121 can be stored and used to represent or analyze the track of each object. More specifically, in the context of analyzing object movement in two dimensions over time, tracks are defined by a set of positional data (i.e., a set of paired x-y positional data) and a set of time values corresponding to the set of positional data (i.e., t values for each x-y pair). Thus, each track could be defined using a matrix or array having an x vector $\vec{X}$, a y vector $\vec{Y}$, and a t vector $\vec{T}$, such as the one shown below in Table 1.

TABLE 1

| $\vec{X}$ | $\vec{Y}$ | $\vec{T}$ |
|---|---|---|
| x[1] | y[1] | t[1] |
| x[2] | y[2] | t[2] |
| • | • | • |
| • | • | • |
| • | • | • |
| x[n] | y[n] | t[n] |

In Table 1 above, at any given time t[i], the time value t[i] (also referred to as a time stamp) is recorded along with the corresponding two dimensional positional data, including a corresponding x component x[i] and a y component y[i], for each object being tracked at the given time. Thus, in this example, a track consists of a set of three-dimensional data that extend over a given, predetermined period of time (i.e., the time during which the object is being tracked, which can be expressed as t[n]−t[1]). For example, the three-dimensional track data can be expressed as a set of three-dimensional ordered data (x, y, t) at each moment of time for which an object is being tracked.

It should be recognized that in storing track information, such as the track information shown in Table 1 above, the x vector X, the y vector Y, and the t vector T can include more or fewer values than those shown in Table 1 above. For example, if an object is stationary, and the position data remains the same for each time value, fewer values for each vector may be required to represent the track associated with the stationary object. For example, a single x-coordinate and y-coordinate corresponding to the last time value associated with the track of a tracked object can be stored as compressed data to represent the track of a customer. Alternatively, two coordinate pairs (x, y) corresponding to the positions of the first and last time values associated with the track of a tracked object can be stored as compressed data to represent the track of a customer.

According to one or more embodiments of the invention, interaction of individuals (e.g., customers) with the service locations 202 is of interest to proprietors that are responsible for those service locations 202, as well as others. For example, in a retail environment, where the service locations 202 are cash registers, retail proprietors may be interested in determining the efficiency with which customers are serviced at the service locations 202. Additionally, proprietors or other users of the system may also be interested in queuing (e.g., line-forming) activities that occur at or near service locations 202, in retail or other environments. For example, proprietors or other users may be concerned with the average wait times within queues of those who are awaiting service at a service location 202, or with the general length of the queues at those service locations 202.

A "queue" is a line or group of objects. For example, a queue can be a line or group of waiting people or vehicles. People or vehicles waiting in a queue can be awaiting service, such as service in a retail environment, or another event. Objects waiting in a queue need not necessarily form a single-file line. Rather, objects in a queue can include lines having multiple files or dimensions. Additionally, queues need not exhibit an order that is readily apparent or discernable to an observer, but can, instead, appear as a large group of seemingly unordered objects which are awaiting service or another event.

To illustrate certain aspects of the systems and methods of the invention, the environment 200 illustrated in FIG. 2 will be referred to as a retail environment 200. It should be recognized, however, that the environment 200 can be other environments (e.g., banking environments, traffic queuing environments, etc.). The objects or entities (shown as ovals in FIG. 2) interacting with the retail environment 200 are customers, and are tracked by (e.g., their images are captured) by the sensor 121 (shown in FIG. 1). In such a retail environment 200, the service locations 202 are cash register locations. Currently serviced customers 204a, 204b, 204c (i.e., customers that are currently being serviced at one of the active service locations 202) are shown at their respective service locations 202a, 202b, 202c. Additional customers 206a, 206b are shown in a first queue 206, and are awaiting service at the first two service locations 202a, 202b. Another customer 208a is shown in a second queue 208, and is awaiting service at the third service location 202c. The fourth service location 202d is not currently active, and no customer is being serviced at that cash register 202d.

Another customer 210 is passing between the first queue 206 and the second queue 208 (as shown by the track 211 associated with the customer 210) and does not intend to enter either queue 206, 208. Another customer 212 in FIG. 2 is examining a display 214 (e.g., a product display) near the second queue 208. The customer 212 at the product display 214 does not intend to immediately enter either the first queue 206 or the second queue 208.

The movement of the passing customer 210 is traced by the track 211 in the direction indicated by the arrow. The vertical lines crossing the track 211 are positions of the passing customer 210 (e.g., paired x-y data) at each time interval (e.g., each value of t) for which position data are recorded. Thus, if the position of the passing customer 210 shown in FIG. 2 is (x[n], y[n], t[n]), the customer's immediately preceding position is denoted (x[n−1], y[n−1], t[n−1]), and is the position where the customer was located at time t[n−1]. The position immediately following the position of the passing customer 210 shown in FIG. 2 is denoted (x[n+1], y[n+1], t[n+1]), and is the position where the customer was located at time t[n+1], and the other positions are denoted similarly.

Systems and methods of embodiments of the invention are able to determine whether or not entities, such as the various customers in the retail environment 200 illustrated in FIG. 2, are located within a queue without experiencing the extent of difficulties associated with prior approaches, such as those described above, which are experienced when using regions of interest 216, 218. For the sake of comparison with prior approaches, regions of interest 216, 218 are illustrated in FIG. 2 (and in FIG. 4 described below), even though these regions are not used by embodiments of the invention. Examples of prior approaches that use regions of interest to determine which objects are within a queue can be found in co-pending U.S. application Ser. Nos. 09/960,218 and 09/960,617, both filed on Sep. 21, 2001, the disclosures of which are incorporated by reference herein.

Figure 3A:
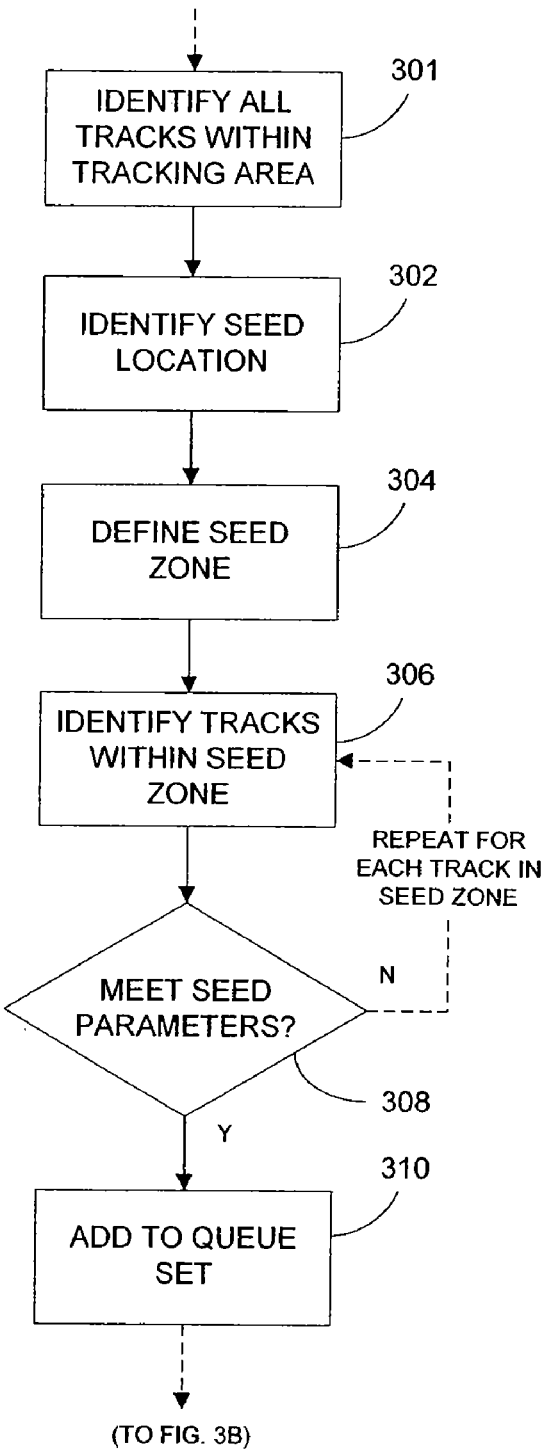
FIG. 3A is a flow diagram illustrating a technique associated with determining if an object meets seed parameters, according to an embodiment of the invention.
Figure 3B:
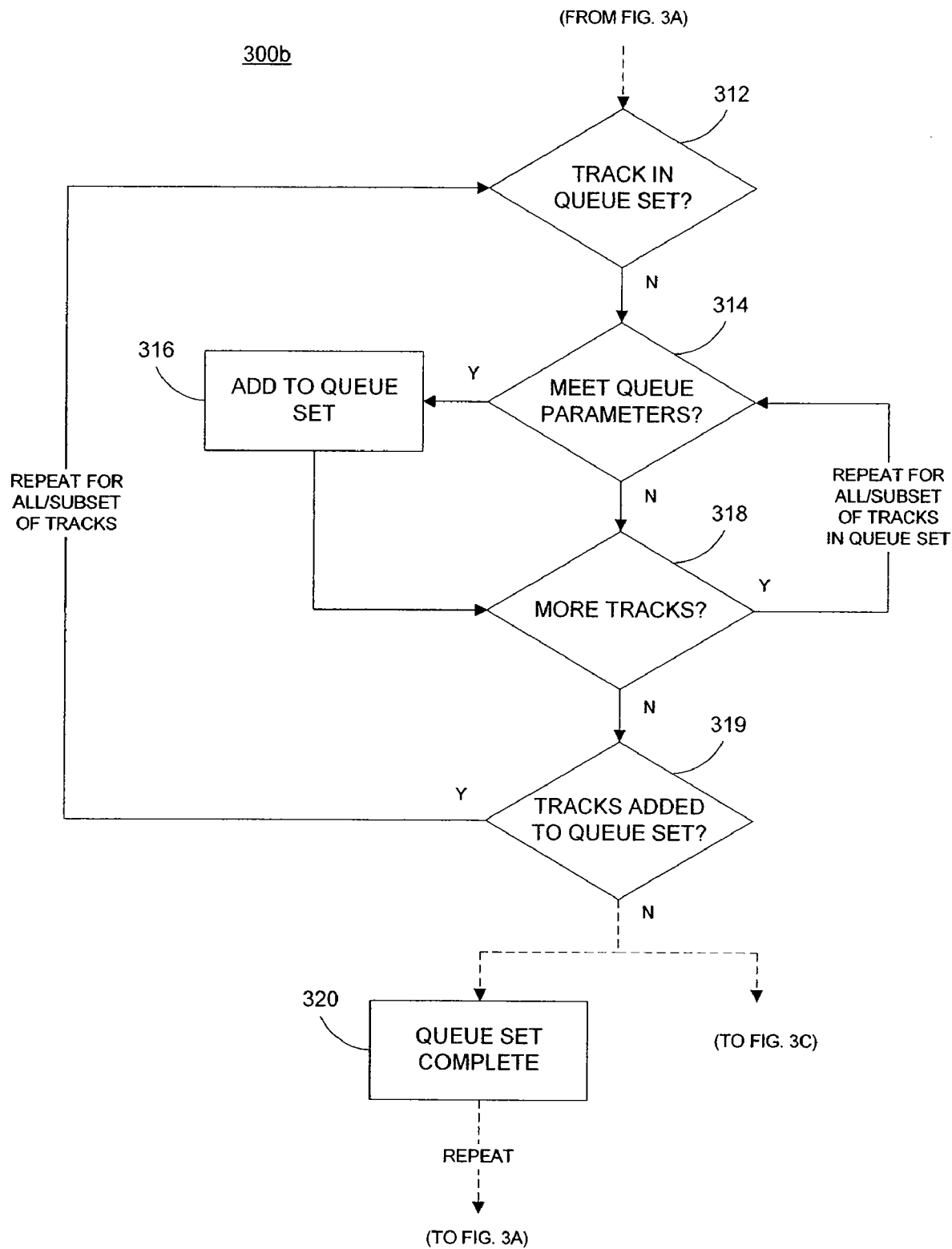
FIG. 3B is a flow diagram illustrating a technique associated with determining if an object meets queue parameters, according to an embodiment of the invention.
Figure 3C:
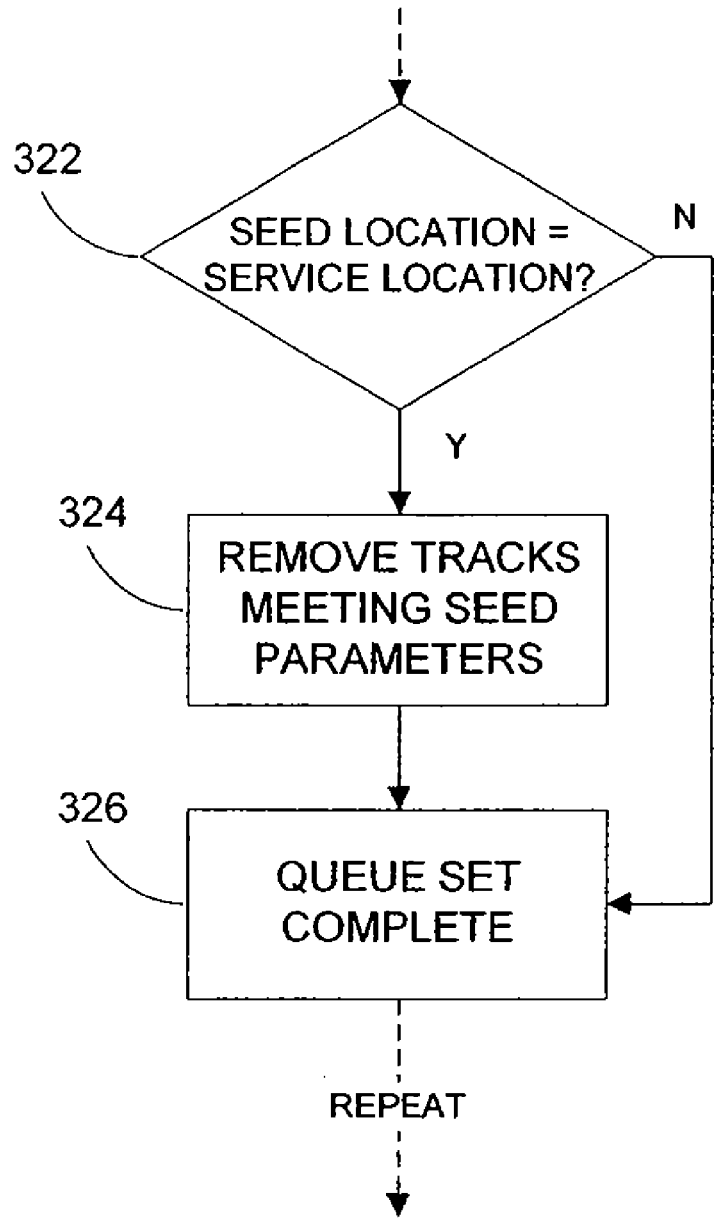
FIG. 3C is a flow diagram illustrating a technique associated with removing tracks from a queue set, according to an embodiment of the invention.

According to one or more embodiments of the invention, determinations regarding which objects are in a queue are made using the techniques shown in FIGS. 3A, 3B, 3C, and/or 3D. For ease of understanding, the steps shown in these figures are described below in connection with the environments 200, 400 shown in FIG. 2 and FIG. 4, respectively. It should be understood that the techniques shown in FIGS. 3A, 3B, 3C, and/or 3D can be repeated multiple times at a predetermined repeat rate to determine which objects are within a queue during a given time, and to determine if any objects have been added to or removed from the queue.

FIG. 3A is a flow diagram illustrating a technique 300a associated with determining whether or not an object meets seed parameters, according to an embodiment of the invention. The technique 300a illustrated in FIG. 3A begins by identifying all tracks within the tracking area in step 301. That is, the tracking system 120 can monitor all objects within a defined tracking area, and tracks associated with each of these objects can be identified in step 301, and can be saved by the system 100 shown in FIG. 1. The tracking area can include the field for which the sensor 121 or multiple sensors 121 can detect objects (e.g., the field of view of one or more image capture devices), a retail environment (e.g., the retail environment 200 shown in FIG. 2), or another area convenient or desirable to be monitored using one or more embodiments of the invention. As mentioned above, the technique 300a can be repeated multiple times (e.g., either alone or in combination with the techniques 300b, 300c shown in FIGS. 3B, 3C, respectively) at a predetermined repeat rate, which is illustrated by the optional return path from FIG. 3B or FIG. 3C shown prior to step 301.

Once all of the tracks within the tracking area have been identified, a seed location is identified in step 302. This seed location can be, for example, a service location 202 or other location of interest. For example, in the retail environment 200 shown in FIG. 2, numerous service locations 202, such as cash register locations, can be identified as seed locations in step 302. For example, in FIG. 2, the active service locations 202b, 202c nearest the locations of the first queue 206 and the second queue 208 can be identified as seed locations for those respective queues in step 302. According to one or more embodiments of the invention, a seed location can be a location near which it is desirable to identify tracks of objects sensed or tracked by the sensor 121 (shown in FIG. 1), which exhibit queuing behavior.

Once the seed location has been identified in step 302, a seed zone, such as seed zones 220a, 220b, 220c shown in FIG. 2 (which can be referred to herein individually, collectively, or as a subset as seed zone 220 or seed zones 220) is defined in step 304. For example, in FIG. 2, the seed zone 220 can be a zone localized near each of the seed locations (e.g., zones 220b, 220c localized near the service locations 202b, 202c nearest to the first queue 206 an the second queue 208, respectively). Each seed zone 220b, 220c can encompass, for example, an area in which a customer receives customer service at the seed locations 202b, 202c. Once the seed zone 220 has been defined in step 304, all tracks corresponding to sensed objects (e.g., objects that have been sensed or tracked by the sensor 121), within the seed zone 220 are identified in step 306. Thus, if the seed zone 220 is properly defined in step 304 (e.g., as seed zones 220b, 220c), the tracks corresponding to the currently serviced customers 204b, 204c will be identified in step 306 as being within the respective defined seed zones 220 for the first queue 206 and the second queue 208. Additionally, it should be noted, that if the first service location 202a is identified as a seed location, and the seed zone 220 is properly defined (e.g., as seed zone 220a), the track associated with the first currently serviced customer 204a will be identified as being within the seed zone. The tracks within the seed zone can be identified in step 306, for example, using a function IdentifyingSeedTracks(ActiveTracks, currentTime), which accepts as arguments the currently active tracks ActiveTracks identified in step 301, and the current time, or time of interest, currentTime, at which the seed tracks are being identified in step 306, and outputs the tracks within the seed zone.

In addition to tracks associated with the currently serviced customers, 204a, 204b, 204c, other tracks associated with other customers, or other objects being tracked or sensed by the sensor 121, can be identified within the seed zone 220 in step 306. For example, the customer 210 passing between the first queue 206 and the second queue 208 can pass within a seed zone. Many of these additional tracks within the seed zone, however, may not be of interest, or may not be associated with queuing activities, and therefore, may not be desirable for analysis. Accordingly, a decision is made in step 308 regarding whether or not one or more seed parameters associated with the defined seed zone 220 have been met. If multiple tracks associated with multiple objects being tracked are identified within the seed zone 220 in step 306, the determination in step 308 can optionally be repeated for each of the tracks until one or more of the tracks meets the predetermined seed parameters.

Once a track has met the one or more predetermined seed parameters in step 308, that track, or the data identifying that track, is added to a queue set in step 310. A queue set is a set of tracks associated with objects being tracked that are determined to be within a queue (e.g., the first queue 206 or the second queue 208). Table 2 below shows an example of an array that can be used to express or store a queue set according to one or more embodiments of the invention.

TABLE 2

| $\Gamma_1$ |
| $\Gamma_2$ |
| $\Gamma_3$ |
| $\cdot$ |
| $\cdot$ |
| $\cdot$ |
| $\Gamma_m$ |

In Table 2 above, the number m of tracks stored in the queue set can vary as the number of tracks determined to meet the seed or queue parameters changes over time, and can be more or fewer than the number shown in Table 2 above.

Each track $\Gamma_i$ shown in Table 2 is expressed as a vector, and is defined in terms of position and time vectors $(\overline{X}_i, \overline{Y}_i, \overline{T}_i)$, generically as shown in Equation 1 below, where the index value i is used to indicate a unique vector, and to show correspondence between each track and its corresponding position and time vectors.

$$\overline{\Gamma}_i = (\overline{X}_i, \overline{Y}_i, \overline{T}_i) \quad (1)$$

The position and time vectors $(\overline{X}_i, \overline{Y}_i, \overline{T}_i)$ can each correspond to the vectors that are used to define a track, shown in Table 1 above, each having one or more values associated therewith. It should be recognized, however, that the vectors need not have multiple values associated therewith if the object associated with a track is stationary during the time that object is being monitored.

The tracks of all objects tracked by the system 100 (shown in FIG. 1) are initially not included as part of the queue set. As objects are determined to be in a queue, the tracks associated with those objects are added to the queue set. The first tracks added to the queue set are those that are determined in step 308 to meet the one or more seed parameters. As described below, additional tracks can be added to the queue set if it is determined that those tracks meet queue parameters. As the techniques 300a, 300b, and/or 300c shown in FIGS. 3A, 3B, and 3C, respectively, are repeated, new tracks meeting the seed parameters or the queue parameters can be added to the queue set, and tracks no longer meeting the seed parameters or the queue parameters can be removed from the queue set.

Several predetermined seed parameters can be used in step 308 to determine whether or not a track within the seed zone 220 should be added to the queue set in step 310. According to one or more embodiments of the invention, for example, the predetermined seed parameter includes at least a position value of the object associated with the track within the seed zone. For example, a customer in the retail environment 200 shown in FIG. 2 is considered to meet the seed parameter, according to one or more embodiments of the invention, if the amount of displacement $\Delta d$ of the position of that customer is within a threshold amount of displacement $\Delta d_T$ over a predetermined period of time, as shown below in Equation 2.

$$\Delta d \le \Delta d_T \quad (2)$$

The displacement $\Delta d$ of a customer can be determined by calculating the distance between an initial position of the customer (x[i], y[i]) and a later position of the customer (x[j], y[j]), as shown below in Equation 3, where i is an index corresponding to a customer's track values at a first time t[i] and j is an index corresponding a customer's track values at a later time t[j].

$$\Delta d \Big|_{t=t[i]}^{t=t[j]} = \sqrt{(x[j] - x[i])^2 + (y[j] - y[i])^2} \qquad (3)$$

Although a customer's displacement is generally measured from an initial position of the customer, another reference position $(x_0, y_0)$ (e.g., a seed location) can be substituted for the initial position of the customer $(x[i], y[i])$ in Equation 3 above to calculate the customer's displacement from that position reference $(x_0, y_0)$.

The amount of displacement $\Delta d$ of the position of a customer can be found to be within a threshold amount of displacement $\Delta d_T$ over a predetermined period of time, satisfying Equation 2, in three instances. First, the displacement $\Delta d$ can be less than, or equal to, some maximum threshold displacement $\Delta d_{T\_Max}$, as shown in Equation 4 below.

$$\Delta d \leq \Delta d_{T\_Max} \qquad (4)$$

Second, the displacement $\Delta d$ can be greater than, or equal to some minimum threshold displacement $\Delta d_{T\_Min}$, as shown in Equation 5 below.

$$\Delta d \geq \Delta d_{T\_Min} \qquad (5)$$

Third, the displacement $\Delta d$ can be within a range between a minimum threshold distance $\Delta d_{T\_Min}$ and a maximum threshold distance $\Delta d_{T\_Max}$, as shown in Equation 6 below.

$$\Delta d_{T\_Min} \leq \Delta d \leq \Delta d_{T\_Max} \qquad (6)$$

It will be recognized that, for Equations 4, 5, and 6, above, as well as any equations below, although threshold values are defined as inclusive limits, they could also be exclusive limits, not included as satisfying the threshold requirements. That is, although the threshold values are included as satisfying a threshold requirement (i.e., all inequalities are expressed using the inclusive greater-than-or-equal-to symbol $\geq$ or the less-than-or-equal-to symbol $\leq$), these threshold values need not be inclusive. Thus, in all of the equations herein, greater than symbols > or less than symbols < can be substituted for their respective, counterpart, inclusive symbols $\geq$, $\leq$.

According to one or more embodiments of the invention, a customer would be considered to have met the displacement parameter described above if that customer remains within an area of approximately 24 inches for a period of time greater than about five seconds. That is, the customer's displacement must remain equal to or less than the maximum threshold distance $\Delta d_{T\_Max}$ of 24 inches for a period of at least five seconds. It should be noted, however, that the displacement and time period thresholds associated with the predetermined seed parameters can be varied according to desired performance of the system, needs according to specific implementations, requirements of different environments, or other parameters.

According to one or more embodiments of the invention, the seed parameters can include a velocity parameter. Such a velocity parameter can be used either in place of or in addition to the displacement parameter discussed above. For example, the track of a tracked object within a seed zone can be determined to have met the predetermined seed parameters if the velocity v of that object (i.e., the time-rate-of-change of the customer's displacement) remains within a predetermined threshold velocity $v_T$ over a predetermined period of time, as shown below in Equation 7.

$$v \in v_T \qquad (7)$$

The velocity v of a an object (e.g., a customer) can be determined by calculating the rate of change in a customer's position from a first position $(x[i], y[i])$ at a first time $t=t[i]$ to a second position $(x[j], y[j])$ at a second time $t=t[j]$, evaluated over the time period from the first time $t[i]$ to the second time $t[j]$, as shown below in Equation 8.

$$v \Big|_{t=t[i]}^{t=t[j]} = \frac{\Delta d \Big|_{t=t[i]}^{t=t[j]}}{t[j] - t[i]} \qquad (8)$$

The velocity v of an object (e.g., a customer) can be found to be within a threshold velocity $v_T$ over a predetermined period of time, satisfying Equation 7 above, in three instances. First, the velocity v can be less than, or equal to, some maximum threshold velocity $v_{T\_Max}$, as shown in Equation 9 below.

$$v \leq v_{T\_Max} \qquad (9)$$

Second, the velocity v can be greater than, or equal to some minimum threshold velocity $v_{T\_Min}$, as shown in Equation 10 below.

$$v \geq v_{T\_Min} \qquad (10)$$

Third, the velocity v can be within a range between a minimum threshold velocity $v_{T\_Min}$ and a maximum threshold distance $v_{T\_Max}$, as shown in Equation 11 below.

$$v_{T\_Min} \leq v \leq v_{T\_Max} \qquad (11)$$

According to one or more embodiments of the invention, a customer can be determined to have met the seed parameters if that customer's velocity v remains below the maximum threshold velocity $v_{T\_Max}$ of about 20 inches per second during a time period of approximately five seconds. The velocity v can, according to one or more embodiments be calculated at each time stamp value (e.g., once per second) using a larger time window. For example, the velocity can be calculated over a time period of three seconds, such that the value of the denominator of Equation 8 is three seconds, according to one or more embodiments of the invention.

The predetermined seed parameter determined in step 308 can include either a displacement parameter or a velocity parameter, or some combination of the two. Additionally, seed parameters can include other parameters not mentioned above, depending upon the desired function of the system. All tracks that are determined in step 308 to meet the predetermined seed parameters are added to the queue set, which can be stored in memory (e.g., the memory components 114, 124 shown in FIG. 1) in step 310.

The situation shown in the environment 200 of FIG. 2 is temporary, as each of the objects shown therein can change positions over time. For example, any of the currently serviced customers 204a, 204b, 204c can leave their respective seed zones 220a, 220b, 220c, at which point they would no longer be determined in step 308 to meet the seed parameters, and therefore would be removed from the queue set.

FIG. 3B is flow diagram illustrating a technique 300b associated with determining whether or not an object meets queue parameters, according to an embodiment of the invention. The technique 300b in FIG. 3B is a continuation of the technique 300a shown in FIG. 3A. In FIG. 3B, a determination is made in step 312 if each track identified in step 301 shown in FIG. 3A by the sensor 121 (shown in FIG. 1) is included in the queue set. That is, each track that has been added to the queue set (e.g., as described in connection with Table 2 above) is removed from consideration in the technique 300b shown in FIG. 3B.

For each track identified in step 301 (shown in FIG. 3A) that is not within the queue set, a determination 314 is made regarding whether or not one or more predetermined queue parameters have been met with respect to a track already added to the queue set. This determination 314 can be made, for example, using a function MeetsQueueParameter(Track), which accepts a track Track as input, and outputs a positive or negative determination regarding whether that track is within the one or more predetermined queue parameters.

Each track meeting the queue parameters with respect to the track in the queue set is added to the queue set in step 316, as the determination 314 repeats recursively for each track in the queue set (or some subset thereof) if it is determined in step 318 that more tracks remain in the queue set that have not been compared to tracks not within the queue set. It should be understood that the determination 314 shown in FIG. 3B regarding whether or not the one or more predetermined queue parameters have been met can include one or more individual determinations, depending upon the desired performance of the system. Some possible predetermined queue parameters are discussed in greater detail below in connection with FIG. 3D.

After all the tracks determined in step 314 to meet the predetermined queue parameters have been added to the queue set in step 316, a determination is made in step 319 regarding whether new tracks have been added to the queue set. This determination is made from the prior occurrence of step 319 (i.e., prior to the repeat loop), or if step 319 has not occurred previously, from the prior occurrence of the determination of step 312. If new tracks have been added to the queue set, as determined in step 319, step 312 is repeated for all of the tracks determined not to be in the queue set in step 312, or for some predetermined subset of those tracks.

Once all of the tracks have, or a predetermined subset of tracks has, been added to the queue set in step 316, it will be determined in step 319 that no new tracks have been added to the queue set since the last occurrence of that step 319. Once this determination has been made, the queue set can be completed for the current iteration in step 320. The queue set remains completed until the techniques 300a, 300b, shown in FIGS. 3A and 3B, respectively, are repeated beginning again at step 301 of FIG. 3A, which occurs periodically as shown by the optional arrow leaving step 320 in FIG. 3B. The rate at which these techniques are repeated can vary. For example, according to one or more embodiments of the invention, the techniques 300a, 300b can repeat at the frame capture rate of the sensor 121, or at some multiple or fraction of that frame capture rate. Alternatively, the repeat rate of the techniques 300a, 300b can be a predetermined rate (e.g., once per second).

Instead of completing the queue set in step 320 during the current iteration, the technique 300b can continue in FIG. 3C. It should be noted, however, that the technique 300c illustrated in FIG. 3C is optional, and need not be included with the techniques 300a, 300b described in FIGS. 3A and 3B, respectively. Generally, the technique 300b shown in FIG. 3B will invoke the technique 300c shown in FIG. 3C when the seed location is a service location, as is described in greater detail below.

It should be recognized that the techniques 300a, 300b, 300c of FIGS. 3A, 3B, and 3C, respectively, can be used to analyze queuing activity in real-time, or after tracking information has been collected (e.g., by way of the sensor 121) and stored (e.g., in a memory component 114, 124). In a real-time implementation, the techniques 300a, 300b, 300c can be completed one or more times for each track being analyzed between times associated with discrete locations of objects on a track. During each iteration of the techniques 300a, 300b, 300c, newly qualifying tracks (i.e., those tracks that did not previously meet the seed or queue parameters, but now meet one of the parameters) can be added to the queue set, while tracks that no longer meet the seed or queue parameters can be removed from the queue set. The calculations can, for example, be proportional to processor speed (e.g., the processor 112), the frame rate of the sensor 121, and/or to the amount of tracking data (e.g., the number of tracked objects) processed by the tracking system 120.

Figure 3D:
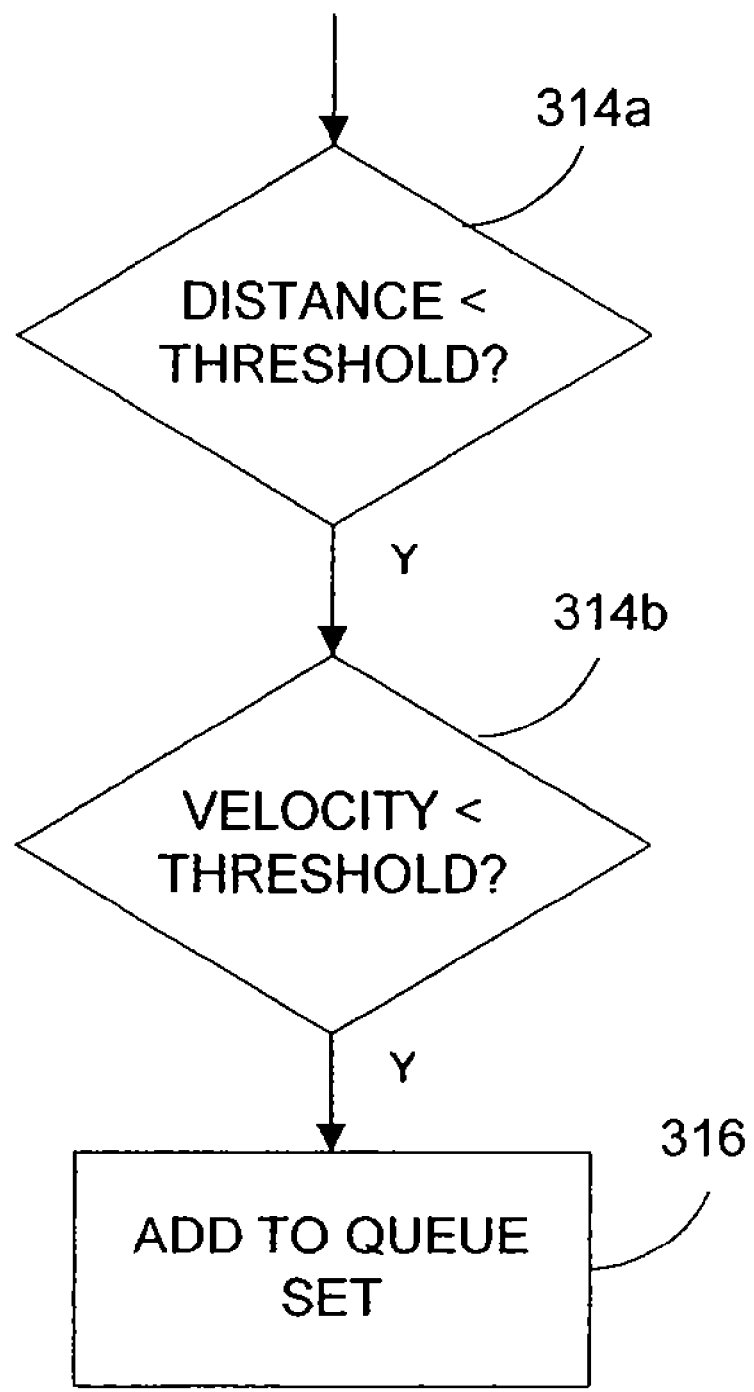
FIG. 3D is a flow diagram illustrating alternative steps associated with determining if queue parameters have been met, according to an embodiment of the invention.

FIG. 3D is a flow diagram illustrating alternative steps associated with determining if queue parameters have been met, according to an embodiment of the invention. As mentioned above, the determination 314 regarding whether the queue parameters have been made can include one or more individual determinations. For example, according to an embodiment of the invention, a distance determination 314a and a velocity determination 314b can be made prior to adding a track to the queue set in step 316. The distance determination 314a of FIG. 3D first finds the distance between two tracks and then determines whether the distance between those tracks is within a predetermined threshold distance. This determination 314a can be made, for example, by calling a function MeetsParameter(CandidateTrack, QueueTrack), which accepts as input a candidate track CandidateTrack (e.g., a track identified in step 301 of FIG. 3A, but not yet in the queue set) and a queue track QueueTrack that is already in the queue set, and outputs a positive or negative determination regarding whether the candidate track CandidateTrack is within the distance threshold.

According to one or more embodiments of the invention, the positions of two objects determined by the tracking system 120 (shown in FIG. 1) can be used to determine the distance $d_{1,2}$ between two tracks associated with the objects at a specified time or over a specified time period. The distance $d_{1,2}$ between the two objects at a specific time (i.e., two portions of the tracks associated with the two objects) can be determined by calculating the distance between the simultaneous positions of the first object ($x_1[i]$, $y_1[i]$) and the second object ($x_2[i]$, $y_2[i]$), evaluated at the same time value $t_1[i]=t_2[i]$ for each object's position, as shown below in Equation 12.

$$d_{1,2}\big|_{t=t_1[i]=t_2[i]} = \sqrt{(x_1[i] - x_2[i])^2 + (y_1[i] - y_2[i])^2} \quad (12)$$

Alternatively, if distance is to be evaluated over some time period, an average distance can be calculated using the average of distances evaluated at specific time intervals. For example, if the average distance $\bar{d}_{1,2}$ between a first object and a second object is to be calculated over three successive time intervals (represented by indices: i, i+1, and i+2), Equation 13 below can be used.

$$\bar{d}_{1,2} = \frac{d_{1,2}\big|_{t=t_1[i]=t_2[i]} + d_{1,2}\big|_{t=t_1[i+1]=t_2[i+1]} + d_{1,2}\big|_{t=t_1[i+2]=t_2[i+2]}}{3} \quad (13)$$

The average distance $\bar{d}_{1,2}$ between a first object and a second object over any number j of successive time intervals (beginning at $t_1[1]=t_2[1]$) can also be calculated using Equation 14 below.

$$\bar{d}_{1,2} = \frac{\sum_{i=1}^{j} d_{1,2}|_{t=t_1[i]=t_2[i]}}{j} \quad (14)$$

According to one or more embodiments of the invention, the index i used in Equations 12, 13, and 14 above is an integer index. According to one or more embodiments of the invention, each instantaneous distance value $d_{1,2}$ is evaluated at successive one-second intervals. It should be recognized, however, that the time intervals at which the distance value $d_{1,2}$ is evaluated can vary according to design constraints and other considerations. Likewise, the number of time intervals over which an average distance $\bar{d}_{1,2}$ is evaluated can vary according to the desired speed of the system. For example, a smaller calculation time window may be desirable in real-time or near-real-time applications because of the inherent latency associated with performing averaging. Additionally, the length of time (i.e., the number of time intervals) over which an average calculation is performed can be adjusted based partially upon the speed with which objects move along their associated tracks, and/or based partially upon the rate of change of the speed of each of the objects to increase accuracy of measurements.

Once the distance $d_{1,2}$ (which may also represent an average distance $\bar{d}_{1,2}$) between the tracks associated with a first object and a second object has been calculated, it is compared to a predetermined threshold distance $d_T$, and a determination 314a is made regarding whether the distance is within a predetermined threshold, as shown below in Equation 15.

$$d_{1,2} \epsilon d_T \quad (15)$$

The distance between two tracks $d_{1,2}$ can be considered within a threshold distance $d_T$, in one of three ways. First, the distance $d_{1,2}$ can be less than, or equal to, some maximum threshold distance $d_{T\_Max}$, as shown in Equation 16 below.

$$d_{1,2} \leq d_{T\_Max} \quad (16)$$

Second, the distance $d_{1,2}$ can be greater than, or equal to some minimum threshold distance $d_{T\_Min}$, as shown in Equation 17 below.

$$d_{1,2} \geq d_{T\_Min} \quad (17)$$

Third, the distance $d_{1,2}$ can be within a range between a minimum threshold distance $d_{T\_Min}$ and a maximum threshold distance $d_{T\_Max}$, as shown in Equation 18 below.

$$d_{1,2} \geq d_{T\_Min} \quad (18)$$

According to one or more embodiments of the invention, a track not yet determined to be within the queue set must be within approximately 48 inches of a track that has previously been determined to be in the queue (i.e., which has been added to the queue set) for a predetermined time period of approximately five seconds. That is, the distance $d_{1,2}$ between the two tracks must be less than or equal to a maximum threshold distance $d_{T\_Max}$ of approximately 48 inches. This can mean that at five one-second intervals, the instantaneous distance $d_{1,2}$ between the two tracks must be approximately 48 inches or less. Alternatively, the average distance $\bar{d}_{1,2}$ between the two tracks, averaged over five one-second intervals, is approximately 48 inches or less. It should be recognized, however, that the minimum distance and predetermined time period requirements can be varied according to desired performance of the system, and other considerations.

In situations where distances between multiple tracks associated with multiple respective objects are to be calculated, according to one or more embodiments of the invention, the distances can be calculated in any order that is convenient. For example, if the tracks identified in step 301 of FIG. 3A are stored in a candidate track storage until (and if) they are added to the queue set, the distances between each track and the track of another object can be handled in the order in which the tracks are retrieved from the candidate track storage. Alternatively, distances can be calculated in some other order depending upon the desired performance of the system. For example, the distance between the track of a first object already added to a queue set and multiple objects not in the queue can begin with the closest track to the track of the first object. Subsequently, calculations can performed to determine the distances of tracks of objects progressively further from the first object within the queue set.

In addition to the distance determination 314a, the velocity of objects can be monitored over time to determine the velocity of each object (e.g., using Equation 8 above), and to determine 314b whether or not the velocity is within a predetermined threshold velocity, as defined by one or more of Equations 7, 9, 10, and 11, above. Once the determination 314b has been made that the velocity of an object is within the threshold velocity, the track of the object is added to the queue set.

The order of the threshold determinations 314a, 314b can be changed from the order shown in FIG. 3D. When the position and/or velocity threshold are "exceeded," the position and/or velocity of the object is outside of the threshold. Thus, where the threshold is a range or a minimum required value, to exceed the threshold can mean to be outside of the acceptable range, and not that the value is greater than a threshold value According to one or more embodiments of the invention, the predetermined queue parameters can include maintaining a velocity below a predetermined velocity threshold during a predetermined time period. That is, determining that the velocity of an object is within a velocity threshold can ensure that an object associated with the track either stops or moves slowly for some period of time to be considered within the queue. For example, as a customer enters a queue or line, typically that customer does not move quickly while remaining in the queue.

According to one or more embodiments of the invention, the velocity of an object associated with the track must remain below approximately 20 inches per second for approximately five seconds. Thus, when the distance and velocity determinations are used together to determine if a customer is in a queue, a customer would need to move a distance within some predetermined distance or displacement threshold during a predetermined time period and maintain a velocity below a predetermined velocity threshold during a predetermined time period. According to one or more embodiments of the invention, the velocity of an object can be determined using the change in position values of the object over a predetermined time period. For example, according to embodiments where the positions of each object are recorded at one-second intervals, the velocity of the object can be calculated at each one-second interval. To calculate the velocity, the change in position over a longer period of time, such as three seconds, for example, can be used.

Referring to FIG. 2, if the seed location identified in step 302 of FIG. 3A is the third service location 202c, the seed zone 220c can be defined to include any customers being serviced at that service location 202c. Specifically, as shown in FIG. 2, the third customer, 204c can be identified as being within a seed zone 220c in step 304 and added to the queue set in step 310. If the seed zone 220c defined in step 304 is large enough, other customers, such as the first customer 208a of the second queue 208 or the customer 210 passing between the first queue 206 and second queue 208 can have tracks within the seed zone 220c. However, the customer 210 passing between the first queue 206 and the second queue 208 might not be added to the queue set because his velocity might exceed the velocity threshold of the seed parameters and/or his distance from the seed location might exceed the predetermined distance of the seed parameters, as determined in step 308. Likewise, the first customer 208a in the second queue 208 might also be determined to exceed the seed parameters (e.g., a distance parameter from the seed location 202c), as determined in step 308 of FIG. 3A; however, if this customer 208a is standing in the second queue, such a determination would be unlikely.

For each of those tracks identified in step 301 of FIG. 3A and not included in the queue set, a determination 314 is made in FIG. 3B regarding whether or not those tracks meet the predetermined queue parameters. For example, the customer 210 passing between the first queue 206 and the second queue 208 likely would not meet a velocity parameter (i.e., the customer 210 would likely exceed a maximum velocity threshold of the predetermined queue parameters), as determined in step 314b of FIG. 3D. Alternatively, or additionally, the customer 210 passing between the first queue 206 and the second queue 208 might not meet distance parameters, as determined in step 314a of FIG. 3D, which can form part of the predetermined queue parameters. Specifically, as the customer 210 continues to pass the queues 206, 208, the distance between the track 211 associated with that customer 210 and any tracks included in the queue set for either queue would probably eventually exceed the maximum distance threshold of the distance parameters, as determined in step 314a.

Thus, although prior approaches might mistakenly consider the passing customer 210 as being in the first queue 206 because the customer 210 might be located within a region of interest (e.g., the first region of interest 216), embodiments of the invention advantageously recognize that the customer 210 is not in the queue because the customer 210 would exceed one or more predetermined queue parameters.

Unlike the customer 210 passing between the queues, the first customer 208a of the second queue 208 would likely meet the predetermined queue parameters (as determined in step 314 of FIG. 3B) for inclusion in the second queue 208. Specifically, the first customer 208a in the second queue 208 would likely be within a distance threshold of the third currently serviced customer 204c, as determined in step 314a of FIG. 3D. Additionally, the first customer 208a in the second queue 208 would have a velocity within a velocity threshold, as determined in step 314b of FIG. 3D, because that customer 208a is standing (i.e., has minimal velocity) within the queue 208. Therefore, because the customer 210 is within both the threshold velocity and the threshold distance from the third currently serviced customer 208a, the customer 208a will be determined in step 314 to meet the predetermined queue parameters, and will be added to the queue set in step 316.

The customer 212 examining the product display 214 would not be added to the queue set because that customer would not meet the predetermined queue parameters, such as a distance parameter and/or a velocity parameter. Specifically, although the customer 212 is stationary near the second queue, and therefore might meet a velocity parameter, that customer 212 would not meet a distance parameter, as determined in step 314 of FIG. 3B. That is, the track associated with the customer 212 is too far from the track associated with the first customer 208a in the second queue 208, and thus exceeds the distance threshold of the predetermined queue parameters. Therefore, unlike prior systems that made use of a region of interest (e.g., the second region of interest 218) systems and methods of the present invention are able to distinguish between customers that are within a queue, and therefore should be added to a queue set, and customers that are close to a queue, but are not within the queue (e.g., customers who are participating in other activities near a queuing location).

As mentioned above, FIG. 3C is an optional technique 300c that can be included with the techniques 300a, 300b described in connection with FIGS. 3A and 3B, respectively. The optional technique 300c shown in FIG. 3C is associated with removing tracks from a queue set, according to an embodiment of the invention. Specifically, after it is determined which tracks meet the predetermined queue parameters, rather than completing the queue set in step 320 of FIG. 3B, the technique 300c of FIG. 3C can begin in step 322. In step 322, a determination is made regarding whether the seed location is the service location. Specifically, if, as is the case in FIG. 2, the service location 202 is the seed location identified in step 302 of FIG. 3A, then all tracks meeting the seed parameters are removed from the queue set in step 324, and the queue set is completed in step 326. If the seed location 202 is not the service point, then the queue set is completed in step 326 without the removal of any tracks meeting seed parameters. This can be useful in environments that wish to distinguish queuing activity from service activity. More specifically, referring to FIG. 2, the third currently serviced customer 204c is being serviced at the third service location 202c, which is a seed location for the second queue 208 and is no longer in the second queue 208. Thus, prior to completing the queue set for the second queue 208 (i.e., the set of all objects or customers located within the second queue 208), the track associated with that third currently serviced customer 204c is removed from the queue set in step 324. By removing the customer 204c at the service location 202c, independent analysis on the track associated with that customer 204c can be performed independent of any analysis of queuing activity, or of activity of tracks associated with customers within the second queue 208.

There are situations in which the seed location is not the service point, or a service location, however. For example, in a situation where multiple service locations 202a, 202b are fed from the same line (e.g., the first queue 206 shown in FIG. 2), it may be desirable to identify the location where the queue (e.g., the first queue 206 shown in FIG. 2) begins. Thus, in FIG. 2, the seed location of the first queue 206 could optionally be defined near where the first queue 206 begins, or near the first person 206a in the first queue 206. In this alternative case, the first two currently serviced customers 204a, 204b need not be removed from the queue set, and therefore, their tracks can be analyzed independently of analysis of tracks associated with the first queue 206, without the need for removing those tracks from the queue set (i.e., without the need for the technique 300c shown in FIG. 3C).

It should be noted that, although the techniques 300a, 300b shown in FIGS. 3A and 3B are described above as being used together, they can optionally be used separately. Thus, the technique 300a that determines that one or more seed parameters has been met can be used separately from the technique 300b that determines that one or more queue parameters have been met. For example, the techniques could be executed separately from one another using separate hardware.

According to one or more embodiments of the invention, the tracks associated with objects being tracked can be ordered chronologically, according to time stamps associated with each position of the object along the track. The seed tracks are then analyzed for meeting seed parameters (in step 308 of FIG. 3A), and the queue tracks are analyzed for meeting the queue parameters (in step 314 of FIG. 3B and/or steps 314a, 314b of FIG. 3D). The algorithm below is used to analyze the tracks for meeting seed parameters and queue parameters, and is an example of how the techniques 300a, 300b, 300c can be implemented in an environment, such as the environment 200 of FIG. 2, or other environments.

```
currentTime = time of first track point
While ( currentTime < endTime )
    SeedTracks = IdentifySeedTracks(TrackList, currentTime)
    for ( i = 0; i < number of seed tracks; i++ )
        if ( MeetsQueueParameter(SeedTracks[i]) )
            add SeedTracks[i] to QueueTracks
        else
            add SeedTracks[i] to CandidateTracks
    end for
    bFound = true;
    while ( bFound )
        bFound = false
        for ( j = 0; j < number of candidateTracks; j++ )
            for ( n = 0; n < number of queueTracks; n++ )
                if ( MeetsParameter(candidateTrack[j],
                        queueTracks[n] )
                    Add candidateTrack [j] to tempList
                    break;
                end if
            end for
        end for
        if ( tempList.Size( ) > 0 )
            bFound = true;
            Add tracks on tempList to queueList
            Delete each track on tempList from candidateList
        endif
    end while
    currentTime += 1 second
end while
```

In the pseudo code shown above, SeedTracks[i] are the set of tracks within the seed zone 220 at currentTime, which is the current instant in time (or some predefined prior instant in time) for a real-time implementation, or a time instant of interest in a non-real-time implementation. Each track that is found within the seed zone at the currentTime is added to SeedTracks[i]. The variable candidateTracks is a list of active tracks that are being analyzed and could possibly be found to be within the queue. Once a track from the candidateTracks is found to be within the queue, it is added to queueTracks. The pseudo code listed above is merely intended as one example of how one or more embodiments of the invention can be implemented. The process shown above runs until the currentTime equals the endTime. According to one or more embodiments of the invention, the process shown above can be executed in a real-time or near-real-time environment, in which case the endTime is the current point in time. Alternatively, the above process can be executed in a non-real-time environment, in which case the endTime occurs at the end of some predetermined observation period, or at the end of all time stamps recorded by the tracking system 120.

Figure 4:
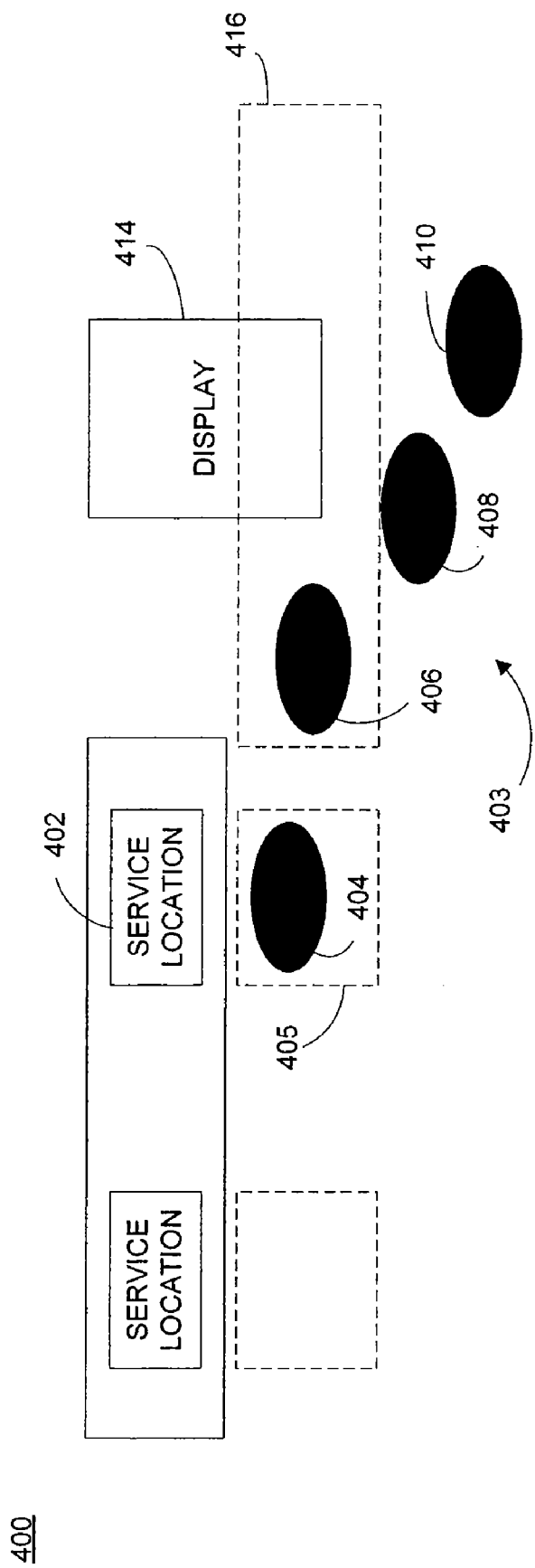
FIG. 4 is a schematic diagram of a floor plan illustrating various aspects of an embodiment of the invention.

FIG. 4 is a schematic diagram of a floor plan illustrating various aspects of an embodiment of the invention. In FIG. 4, a retail environment 400, similar to the environment 200 shown in FIG. 2, is illustrated. In the retail environment 400 shown in FIG. 4, only one service location 402 (e.g., a cash register location) is operating. Thus, there is only one queue 403 of people being formed. Using the techniques 300a, 300b, 300c described in FIGS. 3A, 3B, 3C, and/or 3D, respectively, all tracks within the tracking area are identified in step 301. The tracks associated with the customers in the queue 403 are analyzed and added to the queue set. Specifically, the seed location is identified as the service location 402 in step 302. A seed zone 405 is defined near the seed location 402 in step 304, such that it might be sufficient to contain tracks associated with customers being serviced at the service location 402. In step 306, the first customer 404 is identified as having a track within the seed zone associated with the seed location 402. A determination is made in step 308 regarding whether or not the track of the first customer 404 meets one or more predetermined seed parameters. More specifically, a determination is made in step 308 regarding whether the velocity of the customer 404 is within a threshold velocity, and/or whether the customer 404 maintains a displacement within a displacement threshold over a predetermined period of time. If it is determined in step 308 that the first customer 404 meets the seed parameters, the track of the first customer 404 is added to the queue set for the queue 403 in step 310.

Because the tracks, which were identified in step 301 of FIG. 3A, associated with the second customer 406, the third customer 408, and the fourth customer 410 are not within the seed zone 405, the technique 300a shown in FIG. 3A does not analyze those tracks to determine if they are within one or more seed parameters.

The process continues, as the technique 300b in FIG. 3B is invoked, and a determination 312 is made to determine if each of the remaining tracks (e.g., the tracks associated with the remaining customers 406, 408, 410) is not included in the queue set. Since none of them are yet included in the queue set, a determination is made in step 314 regarding whether the tracks associated with each of the remaining customers 406, 408, 410 meets one or more predetermined queue parameters. If it is determined in step 314 that any of them meets the predetermined queue parameters, the track associated with that customer is added to the queue set in step 316. As mentioned above, the determination 314 can be performed on the remaining tracks in any order, such as the order in which they are stored in or retrieved from a memory component (e.g., the memory components 114, 124 shown in FIG. 1). The order in which the determination 314 is performed on the remaining tracks can be any convenient order, including, for example, beginning with the closest object, and analyzing each successively further object in turn.

For the sake of convenience, and not for limitation, the discussion of adding tracks associated with the customers 406, 408, 410 will assume that the determination is made first for the next-closest remaining customer 406, and that the other customers 408, 410 follow in succession according to the order of their increasing distance from the tracks already added to the queue. It should be recognized, however, that one or more embodiments of the invention can provide for analyzing tracks in other orders.

The second customer 406 is first analyzed and meets the queue parameters, being within both the threshold distance (as determined in step 314a of FIG. 3D) and the threshold velocity (as determined in step 314b of FIG. 3D). Once the track of the second customer 406 is determined 314a, 314b, respectively to be within a threshold distance of the first customer 404, and to be within the threshold velocity, the track of the second customer 406 is added to the queue set associated with the queue 403.

After the queue parameters determination 314 has been made for the closest customer (i.e., the second customer 406) to the customer in the queue set (i.e., the first customer), the determination 314 repeats for all or a predetermined subset of the remaining queue tracks identified in step 301 of FIG. 3A but not yet included in the queue set. Thus, determinations 314 with regard to the first customer 404 are made with respect to the third and fourth customers 408, 410. Although the third and fourth customers 408, 410 each have a velocity within a velocity threshold (e.g., as determined in step 314b of FIG. 3D) they are too far from the first customer 404, and thus would exceed a distance threshold of the predetermined queue parameters. Thus, the determination in step 314 will fail for the remaining customers 408, 410 with respect to the first customer 404.

As indicated in FIG. 3B, however, the determination 319 is made regarding whether any new tracks have been added to the queue set since the last occurrence of step 319 (or step 312, if step 319 has not occurred previously). If new tracks have been added, as determined in step 319, then step 312 is repeated, and step 314 is repeated for all tracks, or a predetermined subset of tracks, not yet added to the queue set. The determination 314 regarding the tracks not yet added to the queue set is repeated for each of the tracks in the queue set. Thus, after the track associated with the second customer 406 has been added to the queue set, the technique 300b shown in FIG. 3B is repeated and the track associated with the third customer 408 is added to the queue in step 316. The track associated with the fourth customer 410 is not added to the queue during this repeat, however, because the track of the fourth customer 410 exceeds the threshold distance (as determined in step 314a of FIG. 3D) with respect to the tracks associated with the first customer 404 and the second customer 406.

Because a new track is determined in step 319 to have been added to the queue set, the technique 300b repeats, as the determination 312 is again made. During this final repeat of the technique 300b, the track associated with the fourth customer 410 is determined in step 314 to meet the queue parameters with respect to the track associated with the third customer. Thus, the track of the fourth customer 410 (the only remaining track not already added to the queue set) is added to the queue set in step 316. After the track of the fourth customer 410 is added to the queue, there are no more tracks that have not been added to the queue set (as determined in step 312 of FIG. 3B), and no new tracks have been added to the queue set (as determined in step 319 of FIG. 3B). Thus, the queue set is completed in step 320, or the technique 300c of FIG. 3C is invoked to complete the queue set in step 326.

After the queue set has been completed in step 320 or step 326, and after the predetermined repeat interval has passed, the technique 300a is again invoked, starting at step 301, and continuing until the queue set is completed again in step 320 or step 326. The techniques 300a, 300b, and/or 300c are, therefore, recursive, and continue to repeat at a predetermined, desired repeat rate.

According to one or more embodiments of the invention, it is desirable to remove customers that are currently being serviced, such as the first customer 404 in FIG. 4, from the queue set. This may be desirable, for example, so that those customers can be analyzed independently from analysis of customers within queues. In such cases, a determination is made in step 322 of FIG. 3C regarding whether or not the seed location is the service location 402. In the environment 400 illustrated in FIG. 4, the service location 402 is the seed location, and therefore, the tracks meeting the seed parameters are removed in step 324, and the queue set is completed in step 326. Thus, the track associated with the first customer 404 is removed from the queue, as soon as the first customer is being serviced at the service point 402. The remaining tracks of the second, third, and fourth customers 406, 408, 410, are the only tracks within the queue set when it is completed in step 326 of FIG. 3C.

The techniques 300a, 300b, 300c illustrated in FIGS. 3A, 3B, 3C, and 3D, respectively, are advantageous in that a queue that has an irregular shape or geometry, such as the queue 403 shown in FIG. 4, which turns to avoid a product display 414, can still be identified as a queue. Prior approaches, however, would fail to properly determine the tracks associated with the queue shown in FIG. 4, because the second and third customers 408, 410 would be located outside of a region of interest 416.

Figure 5:
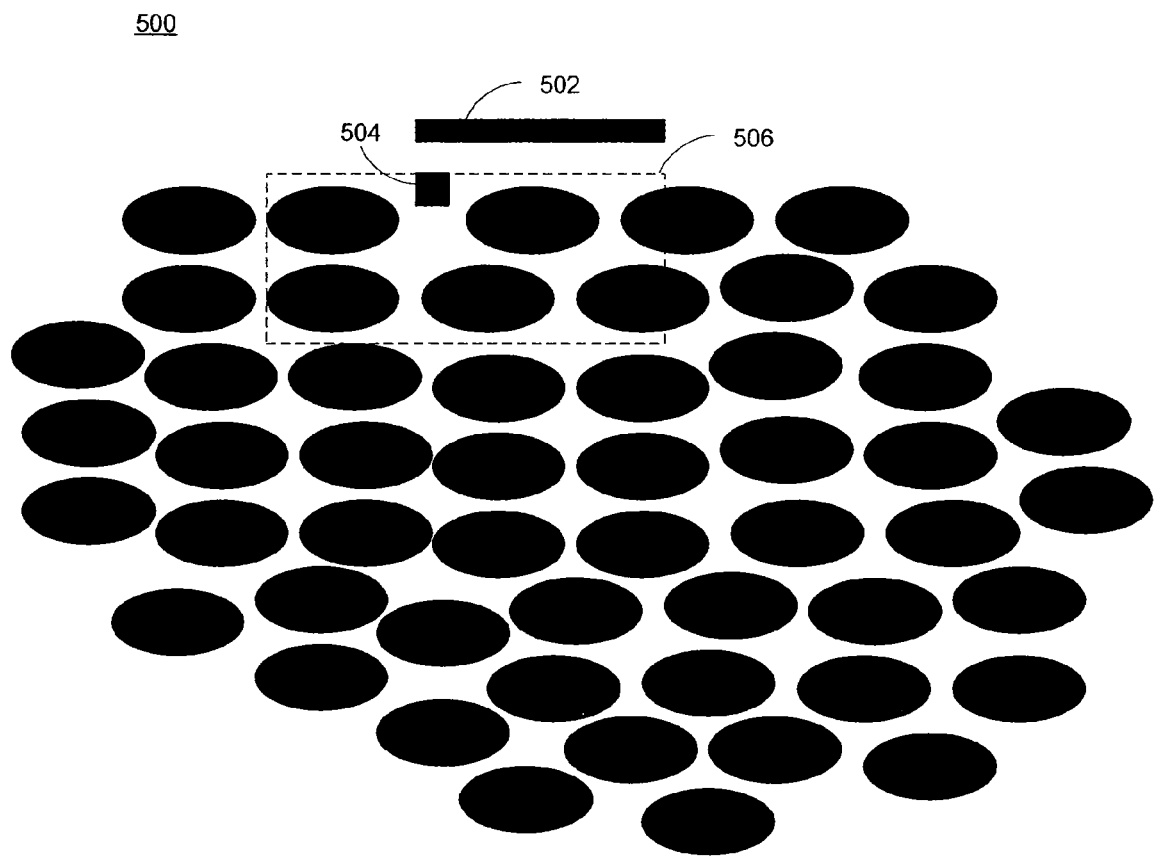
FIG. 5 is a diagram illustrating an example of a queue that can be analyzed according to an embodiment of the invention.
Figure 6:
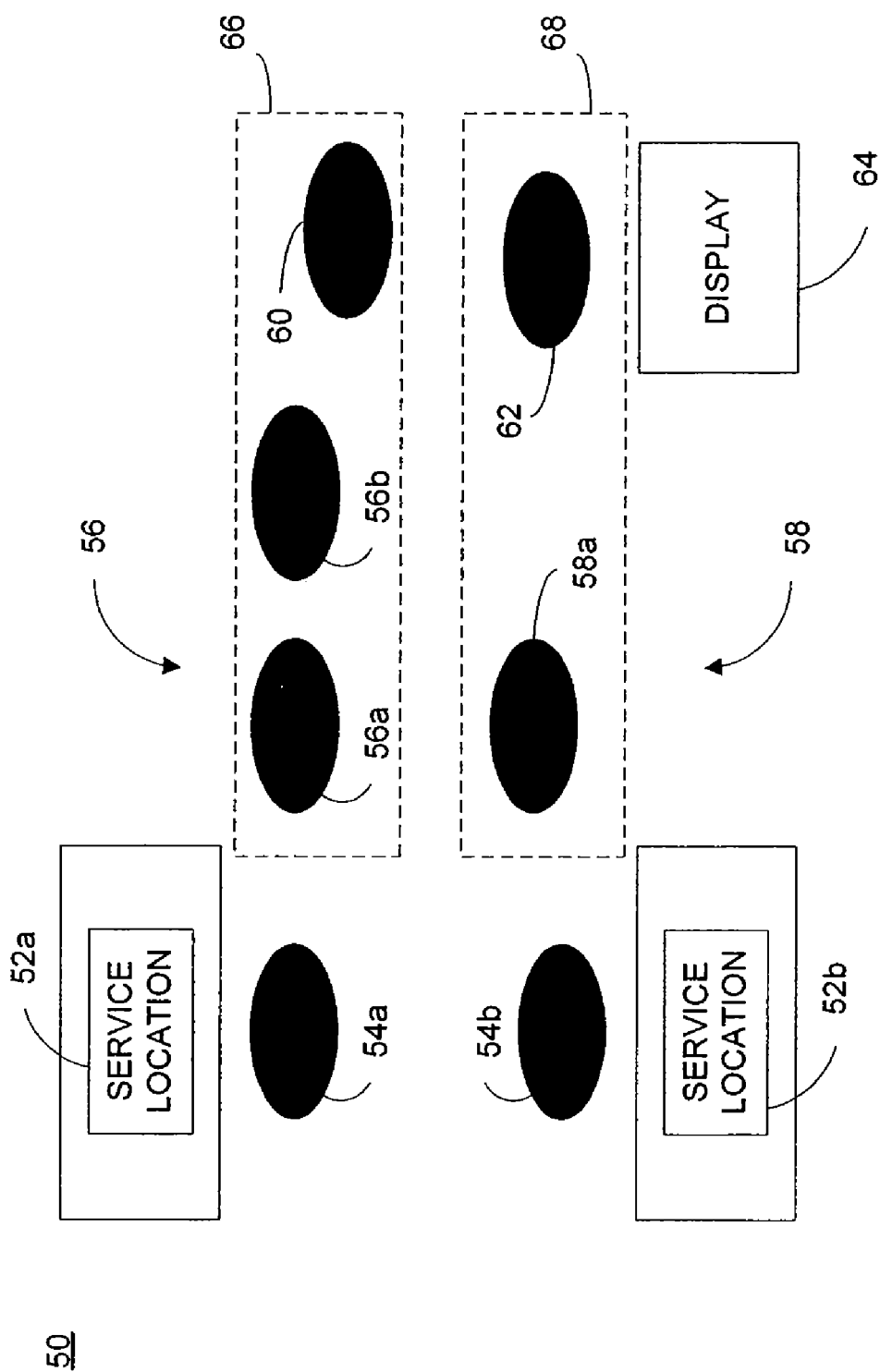
FIG. 6 is a schematic diagram of a floor plan illustrating various aspects of prior systems.

FIG. 5 is a diagram illustrating an example of a queue that can be analyzed according to an embodiment of the invention. An environment 500 is shown in FIG. 5, in which multiple objects are in a queue that is essentially an unordered group of objects. These objects can represent individuals waiting to gain admittance to an entryway or door 502, such as would occur at an event, a concert, a club, a store, or the like. The group of objects shown in FIG. 5 can, for example, be characterized as a multi-dimensional line or queue. The same techniques 300a, 300b, 300c described above in connection with FIGS. 3A, 3B, 3C, and 3D can be used to determine queuing activity of the apparently unordered objects shown in FIG. 5.

First, in step 301 of FIG. 3A, tracks of all tracked objects are identified, such as tracks associated with each of the objects (represented by ovals) shown in FIG. 5. Once all tracks of tracked objects have been identified, a seed location 504 is identified in step 302. This can occur, for example, as a location of some significance is known or discovered. For example, the position of a seed location 504 can be pre-programmed by a user of the system 100 shown in FIG. 1. Alternatively, tracks can be analyzed, and the position having the highest traffic (i.e., the area through which the most tracks pass) can be identified as the seed location 504. This could, for example, correspond to the entryway of a door, the admission post of a velvet rope, or the like.

Once the seed location has been identified, a seed zone 506 is defined in step 304. The seed zone 506 can be, for example, pre-programmed by a user of the system 100 shown in FIG. 1. For example, according to one or more embodiments of the invention, the seed zone 506 can be pre-programmed by a retail proprietor, system administrator, or other interested individual wishing to define the seed zone 506. Alternatively, other methods of defining the seed zone can be employed, either by users of the system 100 (shown in FIG. 1), or by the system 100 itself. Tracks within the seed zone 506 are identified in step 306 and for each of the tracks within the seed zone 506 (or some subset thereof), a determination 308 is made regarding whether seed parameters have been met for the object associated with that track. Each track meeting the seed parameters is added to a queue set in step 310.

All additional tracks not in the queue set are subsequently analyzed (using the technique 300b of FIG. 3B, as discussed above) to determine in step 314 if they meet predetermined queue parameters (e.g., if they meet a predetermined threshold distance and a predetermined threshold velocity, as determined in steps 314a and 314b, respectively, of FIG. 3D). Each object that is determined in step 314 to meet the queue parameters is added to the queue set. The determination 314 is repeated, for each track determined in step 318 to be remaining, with respect to all tracks (or some subset thereof) in the queue set. The determination 314 occurs for the track of each tracked object with respect to each of the tracks currently in the queue set, beginning from the closest track, and repeating for each track located successively further from the track in the queue set.

A determination 319 is made regarding whether or not new tracks have been added to the queue set. If new tracks have been added to the queue set, the technique 300*b* repeats for all tracks previously identified in step 301, but not currently in the queue set. For queue parameter determinations made relative to tracks of other objects, the track of any object can be used, so that once a track associated with an object has been added to a queue set, it does not need to be added or considered again, unless a change occurs that would remove that object from the queue on the next iteration. The order in which the queue parameter determinations are made can be a matter of administrative convenience. For example, the determination can be made in the order in which the tracks are stored in or retrieved from memory. Alternatively, the determination can first be made with respect to the closest object and iteratively with respect to each successively further located object.

From the foregoing, it can be seen that systems and methods that determine if tracked objects are in a queue are provided. Specific embodiments have been described above in connection with retail environments, wherein tracked objects are individuals or customers. Additionally, specific embodiments have been described in the context of objects being tracked using one or more sensors (e.g., an image capture device, etc.).

It will be appreciated, however, that embodiments of the invention can be in other specific forms without departing from the spirit or essential characteristics thereof. For example, while some embodiments have been described in the context of monitoring activity of retail customers or other individuals, one or more embodiments of the invention can be used in other environments. Thus, instead of monitoring individuals and tracking objects corresponding to individuals, other types of objects can be sensed, tracked, and analyzed using the principles of the invention. For example, vehicles can be monitored for queuing activity, such as at toll plazas, freeway entrances and exits, intersections, entrances and exits to businesses, drive-through establishments, and so forth. Additionally, the flow of other objects, which may be analogous to queuing activity can be monitored using one or more embodiments of the invention, such the flow of objects between two locations or the like. Moreover, any convenient technique for tracking the movements of objects can be used as a sensor to detect the movement of objects, and to store a track associated with the object. The presently disclosed embodiments are, therefore, considered in all respects to be illustrative and not restrictive.

What is claimed is:

1. A method, comprising:
    detecting a first object within a defined area using a sensor, the defined area being fixed with respect to a field of detection of the sensor;
    producing a position value of the first object based on an indicator from the sensor, the position value including at least two position coordinates and a corresponding time value; and
    associating the position value of the first object with a queue set when a queue parameter condition is satisfied based on a value calculated based on at least a portion of the position value of the first object and at least a portion of a position value of a second object, the position value of the second object including at least two position coordinates and a corresponding time value, the position value of the second object being associated with the queue set, the queue set defining a queue associated with a seed location that has a fixed location within the defined area.

2. The method of claim 1, wherein the defined area is a first area, the fixed location is a first fixed location,
    the position value of the second object is associated with the queue set when a seed parameter condition is satisfied based on a relationship between the position value of the second object and a second area, the second area being within a predetermined distance of the seed location, the second area has a second fixed location within the defined area.

3. The method of claim 2, wherein at least a portion of the second object is co-located with at least a portion of the second area, the first object is disposed outside of the second area.

4. The method of claim 1, wherein the position value of the first object is used to define a velocity of the first object, the queue parameter condition is satisfied based on the velocity of the first object.

5. A method, comprising:
    detecting a first object within a defined area using a sensor;
    producing a position value of the first object based on an indicator from the sensor, the position value including at least two position coordinates and a corresponding time value;
    associating the position value of the first object with a queue set when at least a portion of the position value of the first object and at least a portion of a position value of a second object satisfies a queue parameter condition, the position value of the second object including at least two position coordinates and a corresponding time value, the position value of the second object being associated with the queue set, the queue set defining a queue associated with a seed location;
    identifying a third object as a final object; and
    closing the queue set for a period of time when at least one of the queue parameter condition or a seed parameter condition is unsatisfied based on a position value of the final object and each track from a plurality of tracks included in the queue set, the position value of the first object being included in a first track from the plurality of tracks, the position value of the second object being included in a second track from the plurality of tracks.

6. A method, comprising:
    detecting a first object within a defined area using a sensor;
    producing a position value of the first object based on an indicator from the sensor, the position value including at least two position coordinates and a corresponding time value;
    associating the position value of the first object with a queue set when at least a portion of the position value of the first object and at least a portion of a position value of a second object satisfies a queue parameter condition, the position value of the second object including at least two position coordinates and a corresponding time value, the position value of the second object being associated with the queue set, the queue set defining a queue associated with a seed location; and
    including a position value associated with a third object in the queue set when the queue parameter condition is satisfied based on a calculated value, the calculated value being based on the position value associated with the third object and at least one of the position value of the first object or the position value of the second object.

7. The method of claim 6, wherein the calculated value is a single-dimensional spatial value.

8. The method of claim 1, wherein the position value of the first object is included in a track of the first object, the position value of the second object is included in a track of the second object, the track of the first object is included in the queue set when the queue parameter condition is satisfied.

9. The method of claim 1, wherein the position value of the first object is included in a track of the first object,
the method, further comprising:
detecting a change in the track of the first object; and
repeating the associating in response to the change.

10. An apparatus, comprising:
a tracking system configured to detect, using a sensor, a first object within a defined area that is fixed with respect to a field of detection of the sensor, the tracking system being configured to produce a position value of the first object based on an indicator from the sensor, the position value being included in a track of the first object, the position value including at least two position coordinates and a corresponding time value; and
a processor system configured to associate the track of the first object with a queue set when a queue parameter condition is satisfied based on a value calculated based on at least a portion of the position value of the first object and at least a portion of a position value of a second object, the position value of the second object being included in the queue set, the queue set defining a queue associated with a seed location, the seed location and the defined area being different.

11. The apparatus of claim 10, wherein the queue parameter condition is satisfied based on at least one of a velocity of the first object or a velocity of the second object, the position value of the first object is a first position value of the first object, the velocity of the first object being calculated based on the first position value of the first object and a second position value of the first object.

12. The apparatus of claim 10, wherein the processor system is configured to calculate a single-dimensional spatial value based on the at least the portion of the position value of the first object and the at least the portion of the position value of the second object, the queue parameter condition is satisfied based on the single-dimensional spatial value.

13. The apparatus of claim 10, wherein the defined area is a first area, the second object is included in the queue set when a seed parameter condition is satisfied based on a velocity of the second object with respect to a second area within a predetermined distance of the seed location, at least a portion of the second object is co-located with at least a portion of the second area.

14. An apparatus, comprising:
a tracking system configured to detect, using a sensor, a first object within a defined area, the tracking system being configured to produce a position value of the first object based on an indicator from the sensor, the position value being included in a track of the first object, the position value including at least two position coordinates and a corresponding time value;
a processor system configured to associate the track of the first object with a queue set when at least a portion of the position value of the first object and at least a portion of a position value of a second object satisfies a queue parameter condition, the position value of the second object being included in the queue set, the queue set defining a queue associated with a seed location, the processor system is configured to associate a position value associated with a third object with the queue set when the queue parameter condition is satisfied based on a calculated value, the calculated value being based on the position value associated with the third object and at least one of the position value of the first object or the position value of the second object.

15. A method, comprising:
detecting, using a sensor, a first object within a defined area that is fixed with respect to a field of detection of the sensor;
producing a position value of the first object based on an indicator from the sensor, the position value including at least two position coordinates and a corresponding time value;
receiving a position value of a second object associated with a beginning of a queue, the position value of the second object being included in a queue set, the queue set defining a queue associated with a seed location that is fixed with respect to the defined area; and
associating the position value of the first object with the queue set when a queue parameter condition is satisfied based on a value calculated based on at least a portion of the position value of the first object and at least a portion of a position value of the second object.

16. The method of claim 15, wherein the defined area is a first area,
the position value of the second object is included in the queue set when a seed parameter condition is satisfied, the seed parameter condition being satisfied based on a relationship between the position value of the second object and a second area, the second area being within a fixed predetermined distance of the seed location.

17. The method of claim 15, wherein the defined area is a first area, the beginning of the queue is defined by a second area within a fixed, predetermined distance of the seed location, the first object is disposed outside of the second area.

18. The method of claim 17, wherein at least a portion of the second object is co-located with at least a portion of the second area.

19. The method of claim 15, wherein the position value of the first object is included in a track of the first object, the position value of the second object is included in a track of the second object, the track of the first object is included in the queue set when the queue parameter condition is satisfied.

20. The method of claim 1, further comprising:
closing the queue set for a period of time when at least one of the queue parameter condition or a seed parameter condition is unsatisfied based on the position value of the first object and each track from a plurality of tracks included in the queue set, the position value of the second object being included in a second track from the plurality of tracks, the first object and the second object being different.

21. The method of claim 1, wherein the calculated value is a single-dimensional spatial value that is calculated independent of a layout of a floor plan within the defined area.

22. The method of claim 1, wherein the calculated value is based on solely on the at least the portion of the position value of the first object and on the at least the portion of the position value of the second object.

23. The method of claim 1, wherein the calculated value is based on a difference between the at least the portion of the position value of the first object and on the at least the portion of the position value of the second object.

24. The method of claim 1, wherein the queue parameter condition is satisfied without defining a queue area associated with the seed location.

25. The method of claim 1, wherein the defined area is a first area, the position value of the second object is associated with the queue set when a seed parameter condition is satisfied based on a relationship between the position value of the second object and a second area, the second area being within a predetermined distance of the seed location, the second area has a fixed location within the defined area, the position value of the second object is not included in the queue set when the second object is outside of the second area.

26. The method of claim 2, wherein the queue parameter condition and the seed parameter condition are different.

27. The method of claim 1, further comprising:
identifying a third object as a final object; and
closing the queue set for a period of time when at least one of the queue parameter condition or a seed parameter condition is unsatisfied based on a position value of the final object and each track from a plurality of tracks included in the queue set, the position value of the first object being included in a first track from the plurality of tracks, the position value of the second object being included in a second track from the plurality of tracks.

28. The method of claim 27, wherein the first object is a first person, the second object is a second person, and the third object is a third person.

29. The method of claim 1, further comprising:
including a position value associated with a third object in the queue set when the queue parameter condition is satisfied based on a calculated value, the calculated value being based on the position value associated with the third object and at least one of the position value of the first object or the position value of the second object.

* * * * *